United States Patent [19]

Charalambous et al.

[11] Patent Number: 4,578,796

[45] Date of Patent: Mar. 25, 1986

[54] PROGRAMMABLE MULTIPLE TYPE DATA SET

[75] Inventors: Salomi T. Charalambous; Mark P. Horvath, both of Lincroft, N.J.; Cathy P. House, Alden, N.Y.; Jeffrey A. Iapicco, Lincroft, N.J.; Paul D. Lue, Freehold, N.J.; Shiv P. Verma, Cedar Knoll, N.J.

[73] Assignees: Bell Telephone Laboratories, Incorporated, Murray Hill; AT&T Information Systems Inc., Holmdel, both of N.J.

[21] Appl. No.: 548,340

[22] Filed: Nov. 3, 1983

[51] Int. Cl.[4] .......................... H04B 1/38; H04L 5/16; H04L 27/10; H04L 27/18

[52] U.S. Cl. .......................................... 375/8; 375/45; 375/52; 375/56

[58] Field of Search ...................... 375/7, 8, 9, 45, 52, 375/56; 329/1, 2; 332/1

[56] References Cited

U.S. PATENT DOCUMENTS

| | | | |
|---|---|---|---|
| 3,699,525 | 10/1972 | Klavins | 340/172.5 |
| 3,958,191 | 5/1976 | Jones, Jr. | 332/1 |
| 4,085,449 | 4/1978 | Walsh et al. | 375/8 |
| 4,263,670 | 4/1981 | Sherman | 375/9 |
| 4,425,664 | 1/1984 | Sherman et al. | 375/8 |

OTHER PUBLICATIONS

"Voiceband Modem Implementation Techniques for Programmable Digital Signal Processors" by J. A. Iapicco and S. P. Verma, published in *Records of the International Conf. on Comm.*, pp. 72.2.1–72.2.6.

Primary Examiner—Douglas W. Olms
Assistant Examiner—Wellington Chin
Attorney, Agent, or Firm—Ronald D. Slusky

[57] ABSTRACT

A digital processor based voiceband modem that provides computers and terminals access to telephone lines and performs line control functions to originate, answer and terminate data calls in addition to converting baseband signals to voiceband and voiceband signals to baseband. The modem utilizes a signal processor that executes various signal converting algorithms under control of selected sets of instructions and further utilizes a digital processor that executes line control algorithms for alternative modes (i.e., originate or answer) of the data modem. An outgoing or incoming call enables the appropriate mode and, during the execution of the corresponding line control algorithm, various sets of instructions are selected to execute signal converting algorithms appropriate for the enabled mode of a specific one of various data modem types.

9 Claims, 20 Drawing Figures

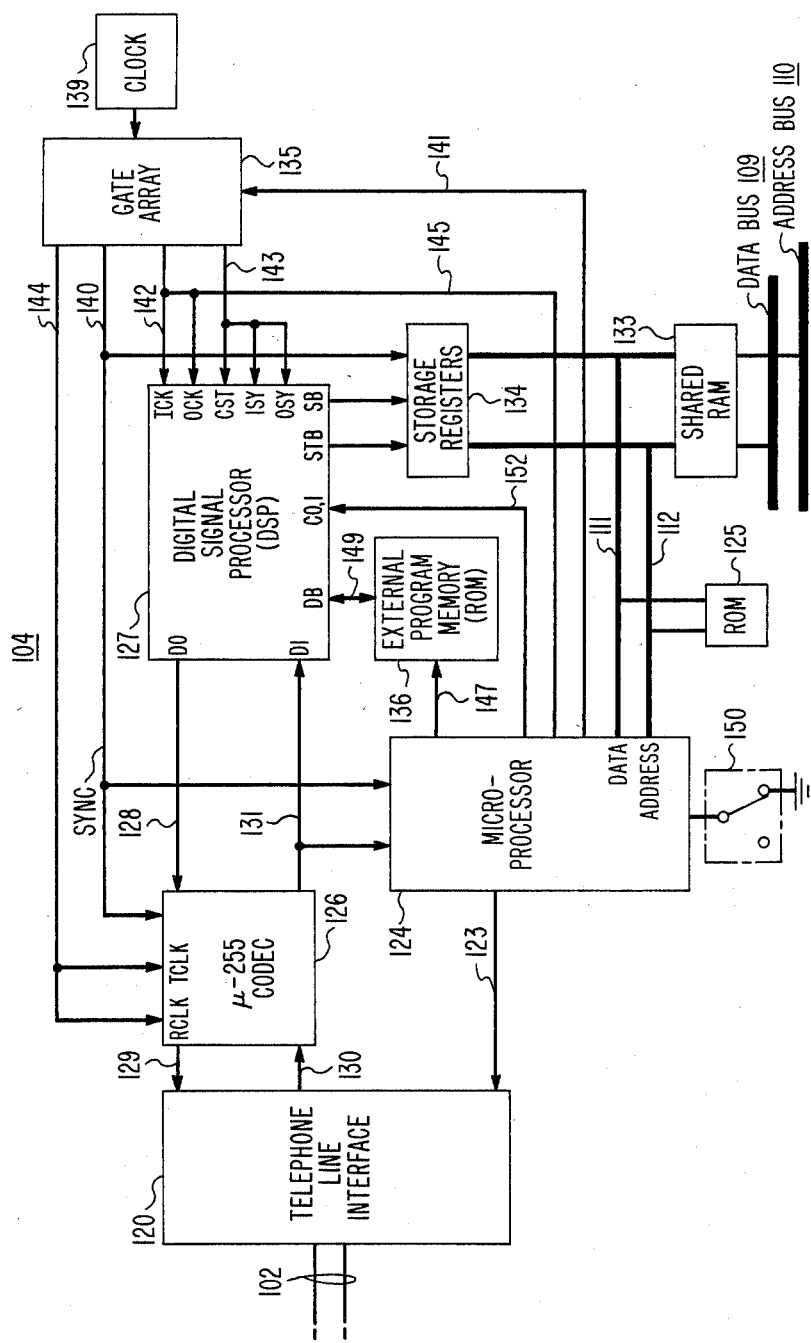

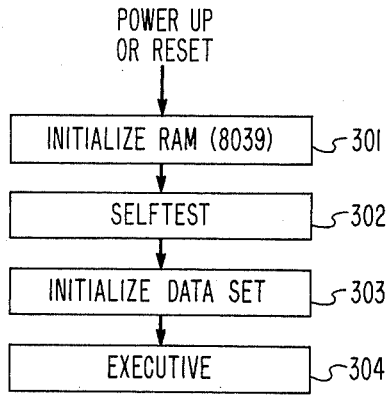
FIG. 3  BACKGROUND ROUTINES
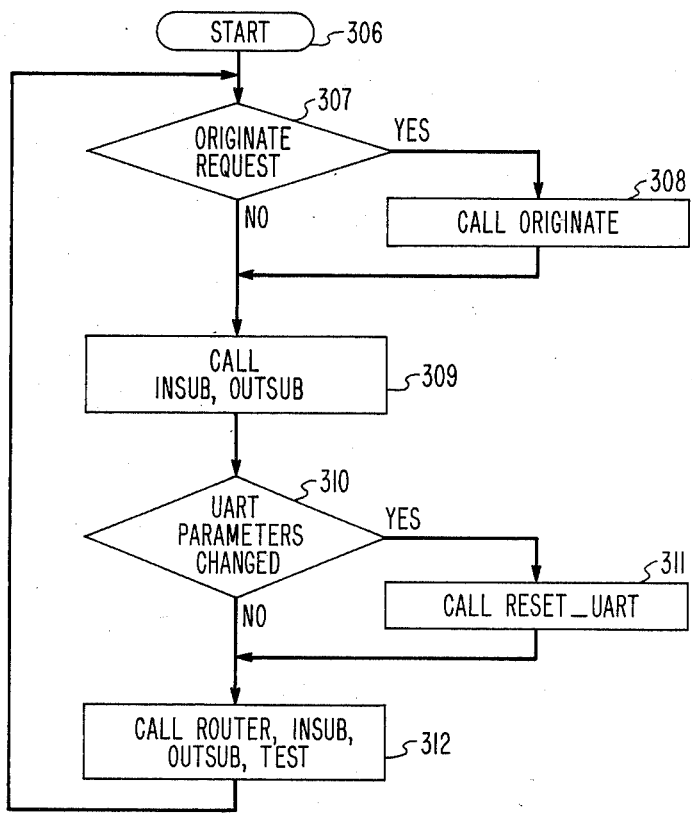
FIG. 5  EXECUTIVE ROUTINE

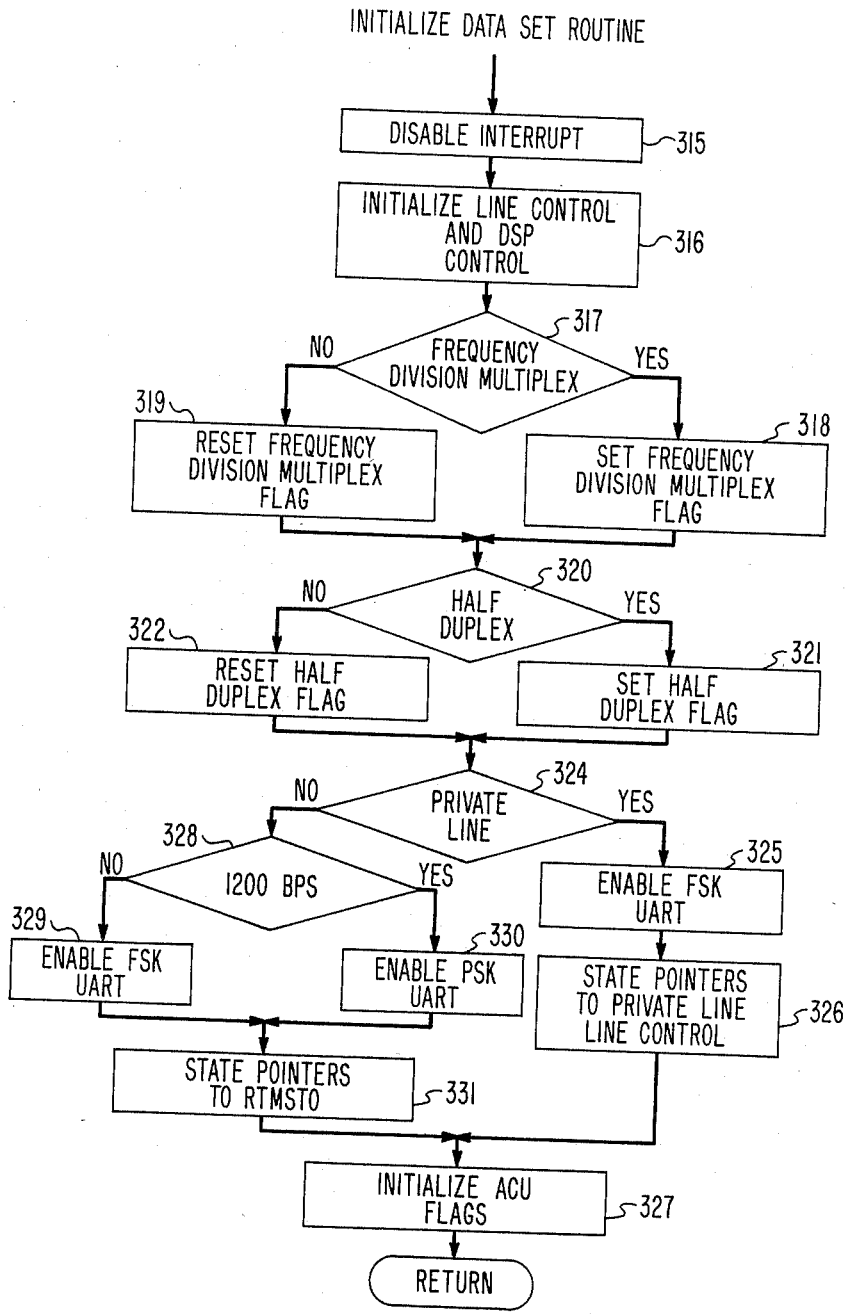

LINE CONTROL ROUTINE

MONITOR ROUTINE

ANSWER ROUTINE

ANSWER ROUTINE

DISCONNECT ROUTINE

FIG. 12 DISCONNECT ROUTINE

DPSK XMIT SUBROUTINE
STATE DIAGRAM

ORIGINATE ROUTINE

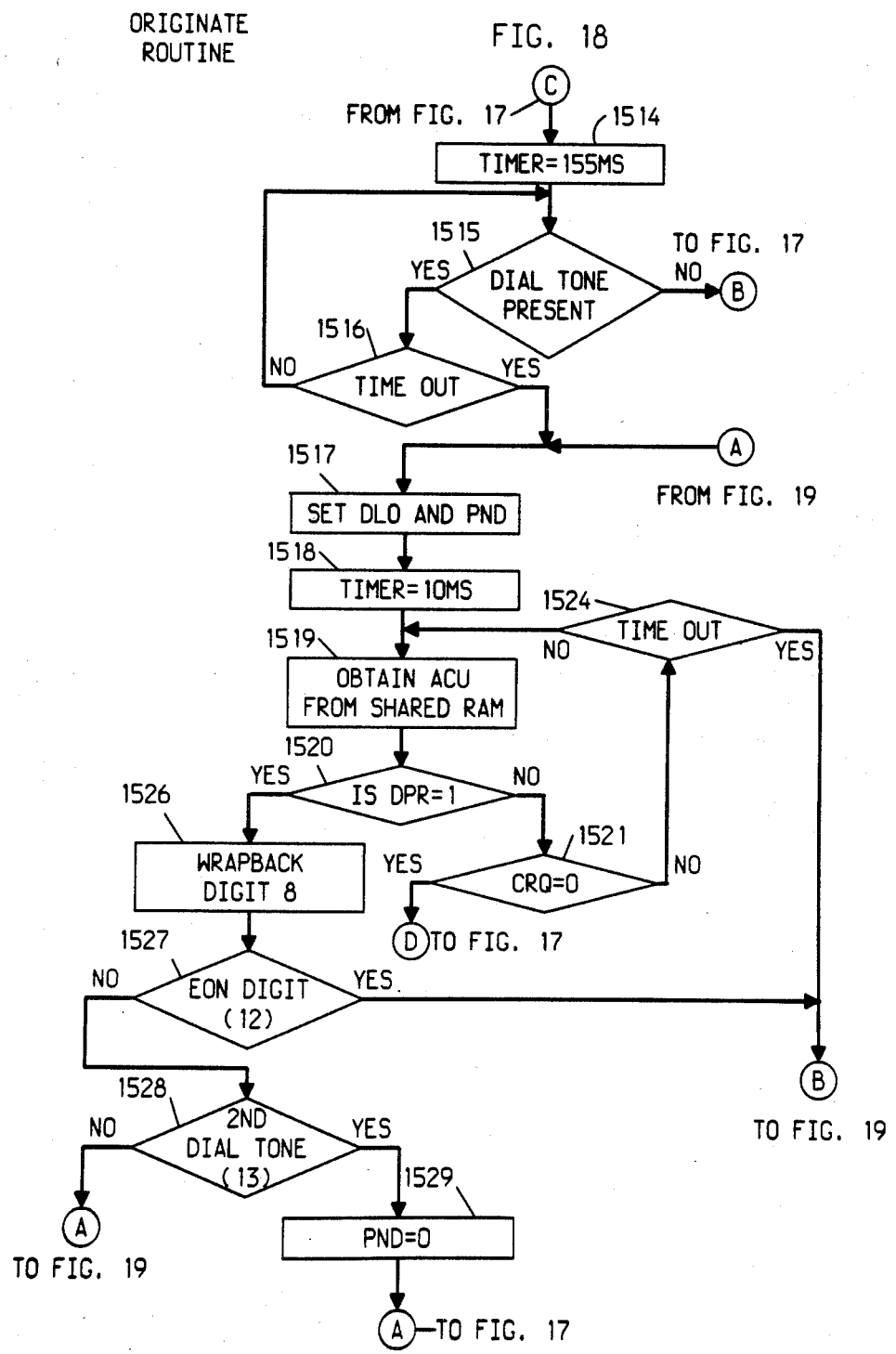

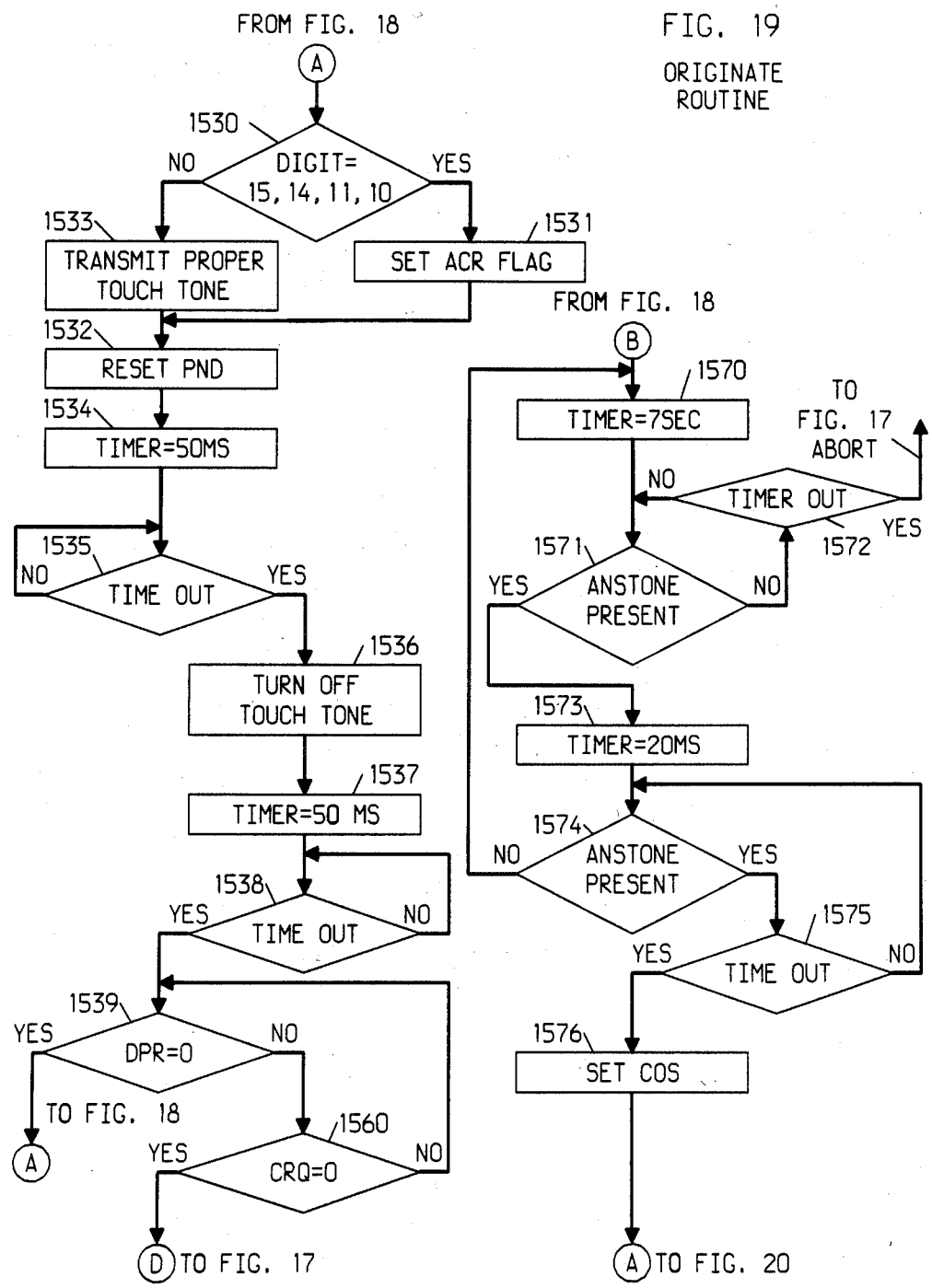

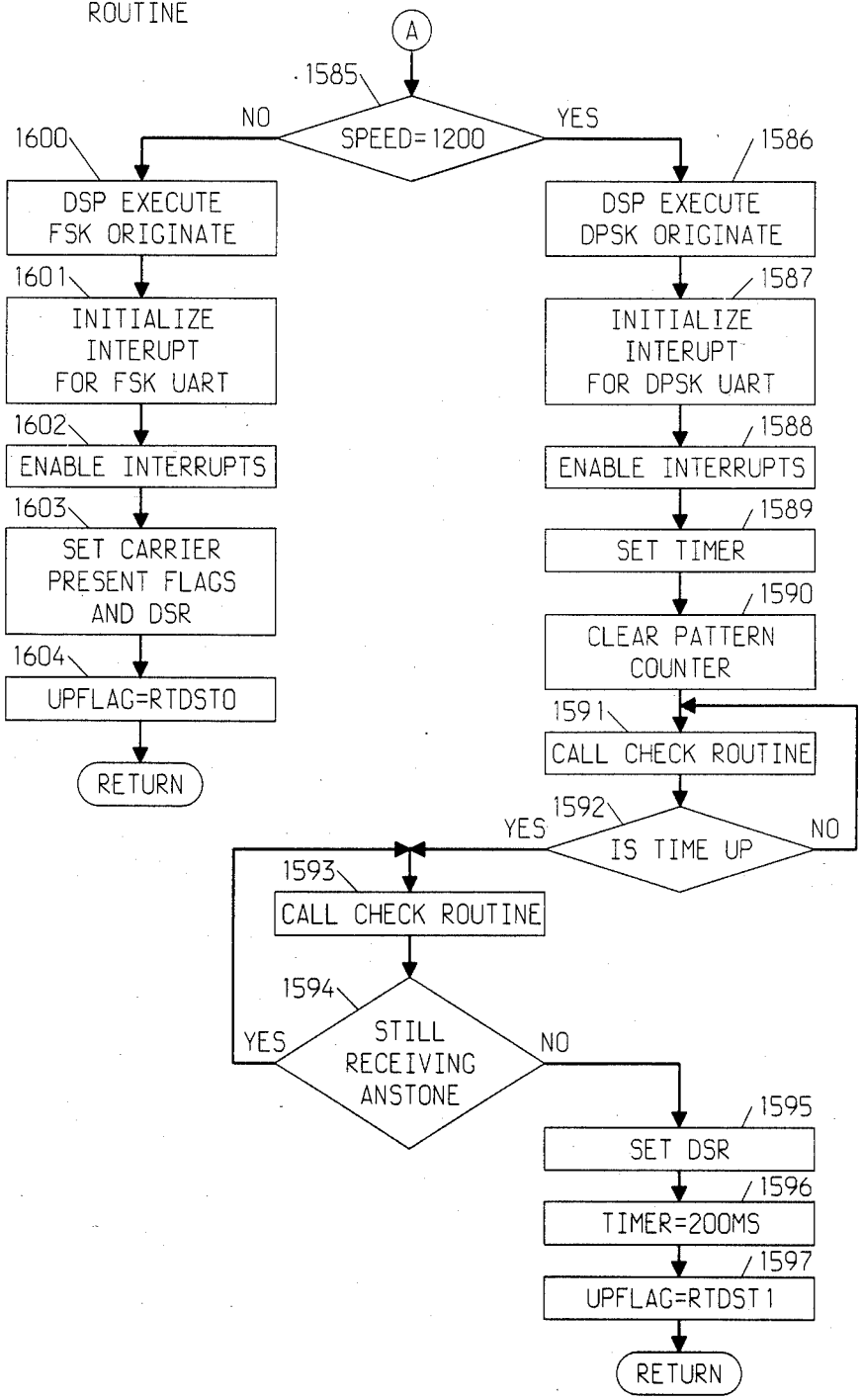
FIG. 20 ORIGINATE ROUTINE

PROGRAMMABLE MULTIPLE TYPE DATA SET

TECHNICAL FIELD

This invention relates to voiceband modems which provide digital devices, such as multiplexers and terminals, access to telephone lines and, more specifically, to modems which perform line control functions to originate, answer and terminate data calls and also perform signal conversion functions to interface digital signaling devices with analog telephone lines.

BACKGROUND OF THE INVENTION

Modern data communication systems commonly require interchange of data between a computer and a remote computer or terminal device. This data interchange may take place over voice grade telephone lines that are either leased from common carriers or are a part of the dial-up telephone network. In either event, modems are required to convert the baseband data signals from the computers or terminals to voice frequency signals suitable for transmission over the telephone lines and to convert the voice frequency signals on the telephone line to baseband data signals suitable for application to the computer or terminal.

Known modems (or data sets) employ different conversion schemes, frequency shift keyed (FSK) modulation and differential phase shift keyed (DPSK) modulation comprising two of the more popular schemes. Bell System data set types 103, 108, 113, 202 and 212 employ one or the other or both of these modulation techniques. The data sets have hard-wired circuitry to perform the data signal conversion (modulation and demodulation) functions.

Another function of data sets, such as the above mentioned Bell System data set types, is to provide communication line control. Communication line control involves the interchange of control and status signals and instructions between the terminal or computer, the data set and the telephone line, which interchange follows certain fixed or predefined procedural sequences in accordance with the "mode" of the data set, the "status" of the telephone line and instructions from the terminal or computer. For example, assuming that the terminal operator or the computer wishes to originate a call through the common carrier switched network, an appropriate instruction (or signal) is sent to the data set which assumes an "originate" mode and goes "off-hook" by completing a path across the tip and ring leads of the dial-up telephone line. The switch network returns "dial tone" which is, optionally, recognized by the terminal operator or by an accompanying automatic calling unit which, in turn, might pass a "proceed-to-dial" indication to the computer or terminal. If, when the data set is in an "idle mode", there is an incoming call, the data set identifies the "ringing" on the telephone line and advises the terminal that a remote set is calling. Assuming that the terminal returns a "data terminal ready" instruction, the data set assumes an "answer" mode, goes "off-hook" and returns an answering tone to the telephone line (and then "looks" for a response from the originating set). During the call, either set, originating or answering, looks for call termination instructions from the terminal and for "disconnect" by the remote set, the latter being identified by "loss of carrier" on the telephone line. In either event, the set assumes the "idle mode" and goes "on-hook" to terminate the telephone connection. These communication line control functions are performed by hard-wired circuitry in the data sets.

Another procedural sequence, which could be characterized as communication line control, constitutes the obtaining of dialing digits from the terminal (when the set assumes the originating mode) and the sending of corresponding multifrequency dialing signals to the telephone line. Bell System Automatic Calling Unit type 801 performs this line control sequence utilizing hard-wired circuitry.

Recent advances in digital processors have resulted in the development of signal processors for converting baseband signals to voiceband and voiceband signals to baseband. The digital signal processor is controlled by software instructions which converts baseband signal to voiceband by, for example, digitally synthesizing a sinusoidal wave in response to the baseband input signal and by computing a baseband signal in response to a digitally synthesized wave derived from voiceband signals.

Moreover, the instruction set could define algorithms for various types of signal conversions, such as FSK or DPSK modulation or conversion of digital signals to multifrequency tones, the digital signal processor being capable of executing the various mathematical computations required by the algorithms and therefore the flexibility to execute the signal conversion functions of varius modems. This flexibility is described in U.S. Pat. No. 3,958,191 issued to G. D. Jones, Jr. which discloses the utilization of three instruction sets for a digital signal processor to perform, alternatively, FSK, DPSK or multifrequency modulation.

It is an object of this invention to utilize digital processors for executing communication line control. More specifically, it is an object of this invention to provide a processor based data set having the flexibility to execute various signal conversion and line signal control algorithms appropriate for different type of data sets or modems.

SUMMARY OF THE INVENTION

This invention utilizes a digital signal processor for executing signal converting algorithms that convert baseband signals to voiceband signals and convert voiceband signals to baseband signals under control of selected sets of instructions and further utilizes a digital processor that executes a designated one of alternative line control algorithms, each algorithm defining the procedural sequences appropriate for each "mode" of data sets of modems. During the execution of the line control algorithm and, more specifically, in response to the execution of certain operations and procedures, various sets of instructions are selected to enable the digital signal processor to execute signal converting algorithms that are appropriate during the certain procedures for the designated mode of a specific one of various data modem types.

In accordance with a specific embodiment of this invention, a data modem is arranged to function as a specific one of various data modem types and to call a remote data station by way of a telephone line in response to a request by a baseband digital data terminal. The digital processor, in response to the request, executes a sequence of operations that calls the remote data station and then enables the terminal to exchange baseband data signals when the remote data station answers. The executed operations advantageously include applying an off-hook condition to the telephone line, instructing the terminal to send dialing digits when dial tone is returned and enabling the terminal to send and receive baseband data when the remote data station returns an answering signal. In response to the execution of the "off-hook" operation, an instruction set is selected to enable the signal processor to execute an algorithm that detects dial tone and generates baseband control signals. Another executed operation advantageously enables the terminal to send dialing digits when the signal processor generates the baseband control signals by detecting the incoming dial tone. In response to the execution of this enabling operation, an instruction set is selected for a signal converting algorithm that converts baseband dialing digits to multifrequency dialing signals.

It is a feature of this invention that the data modem is arranged to execute a sequence of operations appropriate for an "answer mode" when incoming calling signals are on the telephone line. Instruction sets appropriate for the answer mode of a specific one of the data modem types are selected at this time. Thereafter, in response to incoming signals (from the remote station), further instruction sets appropriate for a different data modem type may be selected to thereby render the data modem compatible with the remote station.

The foregoing and other objects and features of this invention will be more fully understood from the following description of an illustrative embodiment thereof taken in conjunction with the accompanying drawings.

BRIEF DESCRIPTION OF THE DRAWING

In the drawings,

FIG. 2 depicts, in block and schematic form, the details of a line signal processor whose components include a signal processor and digital processor which is implemented by a microprocessor;

FIG. 3 discloses a flow diagram of the background routines executed by the digital processor;

FIGS. 4 and 5 show, in flow diagram form, an overview of the initialize and executive background routines;

DETAILED DESCRIPTION

General Architecture

Figure 1:
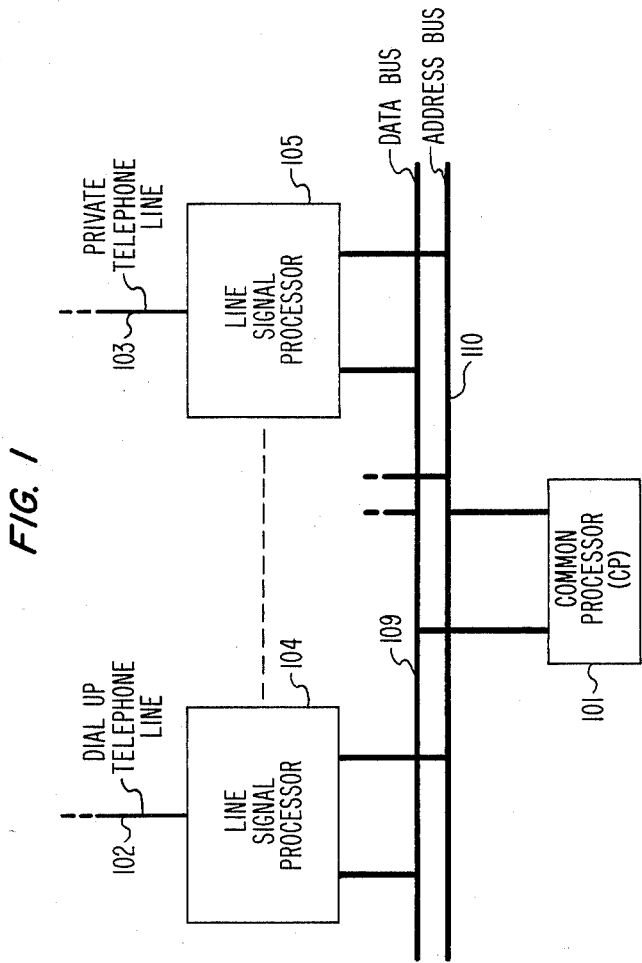
FIG. 1 discloses, in block form, a data station system comprising a plurality of line signal processors and the manner that they interface with telephone lines and digital devices such as computers and terminals.

FIG. 1 discloses a multiple telephone line data sending the receiving system arranged in accordance with this invention. In general, this system originates data calls to, and terminates data calls from, remote stations and systems by way of dial-up telephone lines, such as dial-up telephone line 102 and sends data to and receives data from remote stations and systems via private telephone lines, such as private telephone line 103. As is well known in the art, dial-up telephone line 102 may be connected to the common carrier switching network, whereas private telephone line 103 may be connected to a dedicated channel of the common carrier system which extends to the remote data sending and receiving station, set or system.

The principal components of the multiple telephone line data sending and receiving system comprise common processor 101, data bus 109, address bus 110 and a plurality of line signal processors, such as line signal processor 104 which is connected to dial-up telephone line 102 and line signal processor 105 which is connected to private telephone line 103. Each line signal processor is arranged, as described in detail hereinafter, to exercise appropriate line control over the telephone line connected thereto, to convert incoming analog signals to digital data signals for application to data bus 109 and to convert outgoing digital data signal on data bus 109 to appropriate analog signals in accordance with the "mode" assumed by the line signal processor. Common processor 101, which may constitute one or more computers, interacts by way of address bus 110 and data bus 109 with line signal processors 104 and 105 (and other line signal processors, not shown) by sending instructions and commands which define modes for line signals processors 104 and 105 and which identify dialing digits of desired terminating data stations, by receiving line status information detected by the line signal processors and by sending and receiving the digital data that will be or was converted by the line signal processors.

General Operation

Assume now that common processor 101 desires to originate a call over dial-up telephone line 102 to a remote data set or system and further assume that the common processor understands that the remote set constitutes a low-speed frequency shift data set. Common processor 101 will thereupon apply an appropriate data word to data bus 109 and simultaneously apply an appropriate address word to address bus 110 to instruct line signal processor 104 to assume the mode of a low-speed frequency-shift (FSK) data set. Common processor 101 then instructs line signal processor 104 to become an originate data set and, as described in detail hereinafter, line signal processor 104 proceeds to go "off-hook" by sending an appropriate off-hook signal to telephone line 102. Common processor 101 then advises line signal processor 104 to look for dial tone on telephone line 102 and line signal processor 104 responds by advising common processor 101 when dial tone is received. When common processor 101 is apprised that dial tone has been received, it sends data to line signal processor 104 identifying the various dialing digits which must be applied to telephone line 102 to enable the common carrier switching network to set up a connection to the terminating data set. Line signal processor 104 converts the digits to multifrequency dialing signals for application to telephone line 102.

After the terminating set is dialed, line signal processor 104 proceeds to look for answer tone. In the event that answer tone is not received within a predetermined interval of time, line signal processor 104 advises common processor 101 that the call has not been answered and common processor 101 then determines whether to abort the call. If the answering set is reached and answering tone is received, line signal processor 104 advises common processor 101 that the call has been answered, turns on "carrier" which is applied to telephone line 102 and returns an acknowledgement over telephone line 102 to the answering set. When the acknowledgement has been transmitted for a predetermined interval of time, line signal processor 104 returns a ready-to-send indication to common processor 101. Data received from common processor 101 is now converted by line signal processor 104 to low-speed frequency-shift signals for application to telephone line 102 and incoming frequency shift signals are converted by line signal processor 104 to digital data signal for passage to common processor 101, whereby common processor 101 communicates with the remote answering data set by way of telephone line 102.

When communication between the common processor and the remote answering data set is completed, common processor 101 may advise line signal processor 101 to terminate transmission (by removing the data-terminal-ready signal). Line signal processor 104 thereby terminates the application of carrier to telephone line 102 and "hangs up" by opening telephone line 102 in a conventional manner. If the remote data set terminated transmission, line signal processor 104 detects loss of incoming carrier and advises common processor 101 that the remote set "hung up". At the same time, line signal processor 104 removes outgoing carrier and hangs up in the same manner as described above.

Common processor 101 may also instruct line signal processor 104 to originate a call over dial-up telephone line 102 to a remote differential phase shift (DPSK) data set. In this event, common processor 101 initially sends an instruction to line signal processor 104 to assume the mode of a DPSK data set by applying an appropriate address word to address bus 110 and applying an appropriate data word to data bus 109. Common processor 101 then instructs the line signal processor to become an originate data set. Line signal processor 104 proceeds to go "off-hook" and thereafter looks for dial tone. When dial tone is recognized, line signal processor advises common processor 101 which sends data indentifying the dialing digits for reaching the remote set. Line signal processor 104, in response to the dialing digits from common processor 101, dials the remote answering data set in the same manner as described when it is in the FSK data set mode.

When answer tone is received, line signal processor 104 examines the incoming signals to determine whether it is receiving DPSK signals and, upon such determination, turns on carrier and advises common processor 101 that it is ready-to-send. Line signal processor 104 thereafter sends and receives data signals to and from telephone line 102 using, in this case, an algorithm for converting incoming DPSK signals to digital data signals and, conversely, for converting outgoing digital data signals to DPSK signals. The communication is terminated, the carrier is removed and the line signal processor goes off-hook in substantially the same manner as in the FSK case.

If an incoming call is received over telephone line 102, line signal processor 104 detects the incoming ringing. Assuming that common processor 101 has previously provided an instruction to line signal processor 104 that it is prepared to "talk" to a remote data set (and it has therefore sent a "data terminal ready" instruction), line signal processor 104, upon detecting the ringing signal, goes off-hook. After going off-hook, line signal processor 104 returns an answer tone to telephone line 102, the answer tone being a low-speed frequency shift signal. At the same time, line signal processor 104 using the frequency shift algorithm looks for a response tone on line 102.

Assume now that the remote originating set is a low-speed FSK set. The response tone on line 102 will constitute an FSK tone. Upon recognition of the FSK tone, line signal processor 104 sends a carrier-detect signal to common processor 101. Since line signal processor 104 is presently in the FSK mode, communication can now proceed with the remote data set, sending and receiving FSK data signals over telephone line 102. This call then terminates in the same manner as previously described when the line signal processor 104 was the originating data set in the FSK mode.

Assume now that the remote originating set constitutes a DPSK data set. The response tone from the remote data set will therefore not be recognized by line signal processor 104 which initially is receiving in the FSK mode. Line signal processor 104 will thereupon switch to the DPSK receiving mode and will thus recognize the incoming DPSK signals. Upon this recognition, line signal processor 104 will switch to the DPSK sending mode and send scrambled DPSK data to the originating set by way of telephone line 102. Line signal processor 104 also sends a carrier-detect signal to common processor 101 and thereafter communication between common processor 101 and the remote data set, with line signal processor 104 in the DPSK mode, now proceeds in the same manner as when line signal processor 104 was the originating DPSK data set.

Line signal processor 105, being connected to a private line, and therefore being "permanently" connected to a remote data set, does not require indentification of line status, does not need to exercise line control and does not require circuitry to send dialing digits to private line 103. This description is thereafter principally directed to the details of a "dial-up" line signal processor such as line signal processor 104.

Line Signal Processor Architecture

Refer now to FIG. 2 which shows the details of a typical Line Signal Processor (LSP), such as LSP 104. The interface between LSP 104 and the telephone line, which in FIG. 1 constitutes dial-up telephone line 102, comprises telephone line interface 120. Telephone line interface 120 comprises a standard interface circuit arrangement providing conventional telephone line interfacing functions. Telephone line interface 120 is implemented with a hybrid circuit (not shown) which, when LSP 104 is connected to the telephone line, takes incoming voice frequency signals from telephone line 102 and applies them by way of line 130 of codec 126. In the opposite direction, voice frequency signals from codec 126 applied to telephone line interface 120 by way of lead 129 is forwarded on by the hybrid circuit to telephone line 102.

Since telephone line 102 constitutes a dial-up line extending to the common carrier switched network, another component of telephone line interface 120 advantageously comprises a ring voltage detector (not shown) which identifies incoming ringing signals from telephone line 102 and provides an output during the ring cycle over one of the lines of multiple conductor 123 to microprocessor 124. Another component of telephone line interface 120 is a loop current detector (not shown) which identifies the presence or absence of current flowing in the telephone line and passes a signal designating such presence or absence over one of the lines of multiple conductor 123 to microprocessor 124. In the opposite direction, telephone line interface 120 responds to an "off-hook" signal from microprocessor 124 over one of the lines of multiple conductor 123 by connecting line 102 to codec 126 and, more particularly, by passing voice frequency symbols between telephone line 102 and leads 129 and 130 which, as noted above, extends to codec 126. In addition, in response to the off-hook signal, telephone line interface 120 provides a path for current flow across the tip and ring leads to telephone line 102 to render the telephone line "off-hook". Telephone line interface 120 also advantageously includes a component which responds to a "make busy" signal from microprocessor 124 by way of one of the lines of multiple conductor 123 by completing the above-described current flow path across the tip and ring leads of line 102 without enabling the interchange of voice frequency signals between the telephone line and leads 129 and 130.

A line signal processor, such as line signal processor 105, which is connected to a private line, such as private telephone line 103, may advantageously be arranged in a manner similar to line signal processor 104. For example, line signal processor 105 may include a telephone line interface, corresponding to telephone line interface 120, which is interposed between private telephone line 103 and a codec corresponding to codec 126. Private telephone line 103 typically comprises a 4-wire line. In this event, telephone line interface of line signal processor 105 is implemented with a transformer pair instead of the hybrid circuit to interchange voice frequency signals between the telephone line and the leads extending to the codec, which leads correspond to leads 129 and 130. Since telephone line 103 constitutes a private line, the telephone line interface would not require ring voltage and loop current detectors and off-hook and make busy circuits.

Returning to line signal processor 104, codec 126 comprises a conventional and well known μ255 coder/decoder. More specifically, codec 126 converts the voice frequency analog signals received from telephone line interface 120 on lead 130 to band-limited signals, samples these band-limited signals under control of a sync pulse received from gate array 135 (described in further detail hereinafter) over lead 140, converts each sample to an 8-bit PCM word and clocks the 8-bit word out over lead 131 to Digital Signal Processor 127 under control of clock pulses on terminal RCLK received over lead 144 from gate array 135. In the other direction, 8-bit PCM words received over lead 128 from Digital Signal Processor 127 are clocked in under control of the synchronizing pulse on lead 140 and the clock pulses on lead 144 applied to input terminal TCLK. These PCM words, which represent analog signal samples, are converted to PAM signals which are then reconstructed as voice frequency analog signals for application by way of lead 129 and telephone line interface 120 to telephone line 102.

Microprocessor 124 advantageously comprises the 8039 processor manufactured by Intel Corporation of Santa Clara, Calif. Microprocessor 124 is controlled by program instructions in ROM 125 and by data instructions and address words received on buses 111 and 112 to provide various functions for, and to have various interrelationships with, telephone line interface 120, Digital Signal Processor 127, external program memory 136, storage registers 134 and shared random access memory (RAM) 133.

Communications and instructions transmitted by and received by microprocessor 124 which are destined for and originated by common processor 101 are interchanged by way of shared RAM 133. Shared RAM 133 constitutes a dual port random access memory which can be accessed alternatively in either of two ways. Common processor 101 accesses shared RAM 133 by applying appropriate address signals on address bus 110. This enables common processor 101 to write information into appropriate storage areas or to read information out of appropriate storage areas of shared RAM 133 by way of data bus 109. Similarly, microprocessor 124 accesses shared RAM 133 by applying address signals to address leads 112. This enables the microprocessor to write information into appropriate storage areas of shared RAM 133 via bus 111 or read information out of appropriate storage areas of shared RAM 133 via bus 111. Shared RAM 133 thus acts as a shared storage area for interchanging information between microprocessor 124 and common processor 101.

Additional storage area for passing information is provided by storage registers 134. Storage registers 134 constitute a plurality of registers for storing data status and carrier detect bits (as described hereinafter) received from terminal SB of Digital Signal Processor 127. These bits are clocked into storage registers 134 by a strobe pulse from terminal STB of Digital Signal Processor 127. As described hereinafter, the status and detect bits are derived from "sample" words, the initiation of the words being defined by a synchronizing pulse on lead 140 which is passed to storage registers 134 to enable the registers to steer the bits to appropriate ones of the registers. Microprocessor 124, by the application of appropriate address signals to address leads 112, can also read out information from storage registers 134 over bus 111.

Digital Signal Processor (DSP) 127 is advantageously a single chip processor, specifically designed for signal processing which, in general, involves tone generation and detection and the filtering, modulation and demodulation of signals. Controlled by programs in external program memory 136 and external clock, strobe and synchronizing signals, DSP 127 provides arithmetic functions which are used to perform the modulation, demodulation, filtering and tone generation and detection. The architecture of a digital signal processor suitable for use in this system is described in "Overview: The Device, Support Facilities, and Applications", by J. R. Boddie, *Bell System Technical Journal,* Vol. 60, No. 7, Part 2, September 1981, pp 1431-1439, "Architecture and Performance", by J. R. Boddie et al, *Bell System Technical Journal,* Vol. 60, No. 7, Part 2, September 1981, pp 1449-1462, and "Design of the Assembler", by C. L. Semmelman, *Bell System Technical Journal,* Vol. 60, No. 7, Part 2, September 1981, pp 1483-1497.

Clock, strobe and synchronizing signals for line signal processor 104 are provided by gate array 135. Gate array 135 is, in turn, fed by the output of high speed clock 139. These high speed clock pulses are selected and distributed by gate array 135 to leads 140, 142, 143 and 144. Lead 140 carries synchronizing signals from gate array 135 to codec 126 and to storage registers 134. The synchronizing signal on lead 140 is also applied to microprocessor 124 and, as described hereinafter, this signal is recognized by the microprocessor as a sample clock interrupt. These synchronizing signals define the initiation of words (described hereinafter) that are clocked into and out of codec 126 and registers 134.

The clock pulses for the specific bits of the words clocked into and out of codec 126 are provided by gate array 135 to lead 144. Lead 144 extends to terminals RCLK and TCLK of codec 126. Synchronizing signals provided to input terminals ISY and OSY of Digital Signal Processor 127 and strobe pulses provided to input terminal CST of the DSP are passed through lead 143 by gate array 135. The function of these synchronizing signals and strobe pulses will be described further hereinafter. In addition, clock pulses provided to input terminals ICK and OCK of Digital Signal Processor 127 are passed by gate array 135 through lead 142. Periodically, an inhibiting signal is sent by microprocessor 124 through lead 141 to gate array 135, in which event gate array 135 is inhibited from providing clock pulses to lead 142.

External program memory 136 constitutes a conventional read-only memory. External program memory 136 is arranged in response to address signals provided thereto by way of bus 149 and leads 147 to pass instructions back through bus 149 to Digital Signal Processor 127. External program memory 136 is specifically arranged to store a plurality of sets of instructions. The application of each of a plurality of appropriate addresses by microprocessor 124 to leads 147 selects a desired one of the various sets of instructions while the addresses applied to bus 149 select individual ones of the instructions in the selected set.

In accordance with this invention, the various sets of instructions in external program memory 136 define specific types of control to be exercised over Digital Signal Processor 127. In accordance therewith, when line signal processor 104 is to be arranged to function as an originating set that sends and receives DPSK signals, a first set of instructions is selected by microprocessor 124 to be passed over leads 147 to DSP 127. Another set of instructions is selected by microprocessor 124, if line signal processor 104 is to be arranged as an answering data set that sends and receives DPSK signals since, as is well known in the art, the frequency bands for transmitting and receiving the DPSK signals are reversed with respect to the originating set. Similarly, different sets of instructions are selected by microprocessor 124 if line signal processor 104 is to be arranged as an originating or an answering data set for FSK signals. Other sets of instructions are selected by microprocessor 124 if Digital Signal Processor 127 is to be arranged to generate multifrequency dialing signals or detect incoming dial tone. The manner in which microprocessor 124 determines which set of instructions of external program memory 136 is to be selected is described in further detail hereinafter. An advantageous manner in which external program memory 136 is programmed in order to control Digital Signal Processor 127 to provide these above-identified functions is described in the above-described articles in the *Bell System Technical Journal* and with respect to providing differential phase shift keying and frequency shift keying moduluation and demodulation is further described in "Voiceband Modem Implementation Techniques for Programmable Digital Signal Processors" by J. A. Iapicco and S. P. Verma published in the *Records of the International Conference on Communications,* May, 1981. In addition, with respect to digital filtering, tone generation and tone detection, advantageous implementations for such instructions in external program memory 136 is further described in "A Tutorial Introduction to Digital Filtering", by E. J. Angelo, Jr., *Bell System Technical Journal,* Vol. 60, No. 7, Part 2, September 1981, pp. 1499–1546, "Tone Generation", by D. L. Favin, *Bell System Technical Journal,* Vol. 60, No. 7, Part 2, September 1981, pp 1655–1671, and "Tone Detection for CCITT No. 5 Transceiver", by R. N. Gadenz, *Bell System Technical Journal,* Vol. 60, No. 7, Part 2, September 1981, pp 1687–1698.

To initiate any operation involving the instructions in a set of instructions, microprocessor 124 applies an appropriate address word to leads 147 to select the set and also applies appropriate address data to lead 131. This address data is thereby passed to input terminal DI of Digital Signal Processor 127. Microprocessor 124 simultaneously provides a clock pulse to lead 145, which clock pulse is passed by way of lead 142 to input terminal ICK. It is noted that at this time microprocessor 124 also passes a disabling signal to lead 141 thereby precluding the application of clock pulses to lead 142 by gate array 135. The clock pulse from microprocessor 124 to input terminal ICK clocks in the address data on input terminal DI. This address data is then passed by Digital Signal Processor 127 to bus 149 to obtain the first instruction in the set of instructions simultaneously being selected by microprocessor 124 by way of leads 147. Digital Signal Processor 127 is thereby provided the first instruction of the selected set of instructions which will thereupon also further instruct Digital Signal Processor 127 to continue requesting the subsequent instructions in the selected set.

Assume now that DSP 127 is obtaining instructions from a set of instructions in external program memory 136 to arrange the digital signal processor to receive and detect or demodulate FSK signals. These FSK signals (as previously noted) are sampled and converted to 8-bit words by codec 126 and the 8-bit "sample" words are then passed via lead 131 to input terminal DI of DSP 127. Gate array 135 under control of clock 139 provides a synchronizing pulse to terminal ISY of the DSP at the beginning of each 8-bit sample and provides a clock pulse to terminal ICK to clock in each bit of the 8-bit sample. The DSP demodulates the 8-bit sample thus clocked in and provides to register 134 via output terminal SB a carrier detect bit indicating presence or absence of incoming carrier and a data status bit comprising, in this FSK case, a bit defining a sample of the baseband signal. As previously noted, a synchronizing pulse is applied via lead 140 to storage registers 134 for each 8-bit sample and a strobe pulse is provided at terminal STB and passed to register 134 for each of the carrier detect and status bits. This process is repeated for each 8-bit sample provided to terminal DI.

Assume now that DSP 127 is reading from a set of instructions in external program memory 136 that arranges the DSP to demodulate DPSK signals. The DSP receives 8-bit sample words (defining the DPSK signal) from codec 126, receives the synchronizing clock pulse at input terminal ISY at the initiation of the sample reception and receives the clock pulse at input terminal ICK for each sample bit. In this DPSK case, DSP 127 similarly provides the strobe pulses to terminal STB and now provides four bits at output terminal SB, all of which are passed to register 134. These four bits designate the carrier detect bit, a 2-bit sequence identifying the phase shift of the incoming phase modulated signal and a bit designating a sample of the received clock.

When DSP 127 is reading from the set of instructions in the external program memory 136 that arranges the DSP to detect incoming tone (such as dial or answer tone), an 8-bit sample word from codec 126 is received at input terminal DI, the synchronizing pulse for the word is received at input terminal ISY and the clock pulse for each of the bits is received at input terminal ICK. In this case, a single bit designating the presence or absence of the incoming tone is applied by output terminal SB to registers 134 together with the strobe pulse at output terminal STB.

When DSP 127 is reading from the set of instructions in external program memory 136 that arranges the DSP to end FSK signals, an incoming strobe pulse received on terminal CST from gate array 135 clocks bits from microprocessor 124 on incoming terminals CO,1 to an internal register of the DSP. In the "send" FSK case, the bits are received on only one incoming terminal, each bit designating a sample of the baseband signal to be modulated. A sync pulse on incoming terminal OSY initiates outputting from output terminal DO of an 8-bit word which constitutes a sample of the FSK signal as keyed by the baseband signal samples received from microprocessor 124. Each bit of the 8-bit word is clocked out of terminal DO by the clock pulse on input terminal OCK and is passed to codec 126 on lead 129.

When DSP 127 is instructed to operate as a DPSK modulator, two control bits are provided by microprocessor 124 to input terminals CO,1, which two bits represent the phase shift to be transmitted. These bits are clocked into the internal register of DSP 127 by the strobe pulse on input terminal CST. As before, DSP 127 outputs the 8-bit word sample representing the modulated (DPSK) signal through output terminal DO to codec 126 under the control of the incoming synchronizing pulse at terminal OSY and the bit clock pulse at input terminal OCK.

When external program memory 136 instructs DSP 127 to act as a tone generator, the DSP under control of the synchronizing pulse at input terminal OSY and the clock pulse at input terminal OCK outputs at terminal DO 8-bit words representing the tone signal samples. Incoming bits at terminal CO,1 are, at this time, ignored.

Microprocessor Background Routines

Initialization or start-up of the microprocessor 124 occurs in response to power-up of the system or in response to reset signal from the common processor 101. In response to such start-up, the microprocessor 124 proceeds to obtain sets of instructions from ROM 125 and consequently executes a plurality of "Background" routines symbolicly shown by the flowchart in FIG. 3. As shown in FIG. 3, when start-up or reset occurs, the process provided by microprocessor 124 advances to step 301 which represents a memory initialization routine. In step 301, the microprocessor 124 initializes the information in its internal memory (such as internal random access memory and registers) by setting data defining predetermined initial parameters and values into the various appropriate storage areas of the internal memory in a conventional and well-known manner. Microprocessor 124 then advances to the next background routine. This next routine constitutes step 302 which represents a routine for executing a system self-test to provide standard testing of the various previously described system components of the line signal processor (which in this case is LSP 104), which system self-test is not described herein since such self-testing is well known in the art and not necessary for the understanding of this invention. At the termination of such self-testing and presuming that such self-testing is executed successfully, microprocessor 124 advances to the next Background routines which is identified as step 303.

In step 303, an "initialize data set" routine, described in detail hereinafter, is executed to initialize and set the parameters of the LSP 104 so that the LSP assumes the appropriate mode. More specifically, microprocessor 124 in this routine sets parameters of LSP components to simulate the appropriate data set type in response to, and in accordance with, instructions from the common processor 101. These instructions from common processor to the LSP define (for example) whether the LSP operates in a frequency division multiplexing mode, whether the data set is half duplex or full duplex, and whether or not the signaling speed is to be 1200 bits per second. In addition, a manual switch setting of switch 150 identifies whether the LSP is connected to a private line or to a dial-up line extending through the switched network. At the termination of the "initialize data set" routine, microprocessor 124 advances to the next Background routine, which constitutes the Executive routine executing step 304, as described in further detail hereinafter. The Executive routine comprises various subroutines which, when invoked, provide the operating functions of the data set.

Initialize Data Set Routine

The details of a flowchart of the "initialize data set" routine is shown in FIG. 4. When the "initialize data set" routine is called by the Background routines, it enters and advances to step 315. In step 315, all interrupts of the microprocessor 124 are disabled so that this routine may complete its execution without interruption. The "initialize data set" routine then advances to step 316. In step 316, control leads from the microprocessor 124 to the DSP 127 and line interface 120 are initialized. More specifically, microprocessor 124 sets such control leads to a predetermined initial state. The initialization routine then advances to decision 317.

In decision 317, the microprocessor 124 accesses the shared RAM 133 to examine a portion of the "data set type" instruction word (placed in the shared RAM 133 by the common processor 101 to define the data set type that will be simulated by the system for the data transmission) to determine whether or not the LSP will operate in the frequency division multiplexing mode; that is, whether or not the LSP will be transmitting in one frequency band and receiving in another. In the event that the microprocessor 124 determines that the LSP will operate in the frequency division multiplexing mode, decision 317 advances the routine to step 318 and, in step 318, frequency division multiplex flag is set in the internal memory of the microprocessor 124, which flag will be later used in conjunction with subsequently described programs controlling the DSP 127.

Alternatively, if the microprocessor 124 determines that frequency division multiplexing will not be used, decision 317 advances the routine to step 319 and, in step 319, the flag is reset (or not set). In either event, the routine thereafter advances to decision 320.

In decision 320, the microprocessor 124 again accesses the "data set type" instruction word placed by the common processor 101 in the shared RAM 133 to determine whether the LSP will act as a half duplex or full duplex data set. If the data set will be half duplex, decision 320 advances the routine to step 321 where the microprocessor 124 sets a "half duplex" flag in its internal memory to be used in the execution of subroutines providing functions of a half duplex data set, as described in detail hereinafter. Alternatively, if the microprocessor 124, upon accessing the "data set type" instruction word in the shared RAM 133, determines that the LSP will not act as a half duplex data out, decision 320 advances the routine to step 322 and, in step 322, the microprocessor 124 resets (or does not set) the "half duplex" flag in the internal memory. In either event, the routine then advances to decision 324.

In decision 324, a port pin is examined, which pin extends by way of a lead to manual switch 150 as shown in FIG. 2. This lead will be grounded (by manual switch closure, for example) if the LSP is to be connected via a dial-up line to the common carrier switched network and alternately will be open or unconnected if the LSP is to be of the type which will be connected to a private line.

Assuming first that the LSP is connected to a private line, decision 324 advances the routine to step 325. In step 325, a flag bit is set in an internal register, which flag bit will advise the "Interrupt Handler" routine (described in detail hereinafter) to execute a Universal Asynchronous Receive Transmit (UART) function appropriate for a frequency shift keying (FSK) modulator/demodulator (since all private line data sets utilize FSK modulation/demodulation techniques). The routine thereupon advances to step 326 wherein "primary stage" and "secondary stage" state pointers are set to point or vector, in tandem, to an appropriate state in a "line control" subroutine which, when executing as described hereinafter, provides line control appropriate for a private line data set. Upon setting the state pointers, the data set initialization routine then advances to step 327.

Assume now in decision 324 that the microprocessor 124 determines that the LSP is to be of the type that is connected to a dial-up line extending to the common carrier switched network. Decision 324 thereupon advances the routine to decision 328. In decision 328, the microprocessor 324 again accesses the shared RAM 133 and examines the word placed in there by the common processor 101 and determines whether the data set is to operate at 1200 bits/second. In the event that examination of the word in the shared RAM 133 identifies that the data set operates at 1200 bits/second, the routine advances to step 330 and, in step 330, a flag is set in an internal register, which flag is utilized to advise the "Interrupt Handler" routine (described hereinafter) to execute a UART subroutine appropriate for a phase shift modulator/demodulator since 1200 bits/second data sets utilize phase shift modulation/demodulation techniques. Alternatively, if in decision 328 the microprocessor 124 determines that the LSP data set is not going to operate at the 1200 bits/second speed (which other speeds are lower than the 1200 bits/second), decision 328 advances the routine to step 329. In step 329, a bit is placed in an internal register to advise the Interrupt Handler routine to execute the appropriate UART subroutine for a frequency shift keying modulator/demodulator technique. In either event, whether the routine performs step 329 or step 330, it thereafter advances to step 331. In step 331, the primary stage and secondary stage state pointers are set to point, in tandem, to an appropriate subroutine in the Router routine to execute line control appropriate for a dial-up line data set. The initialize data set routine then advances to step 327.

In step 327, the microprocessor 124 initializes or sets certain flags in the shared RAM 133, which flags will indicate to the common processor 101 whether the Originate routine which includes various automatic calling unit (ACU) subroutines (described in detail hereinafter) will be invoked, it being understood that such routines are generally invoked for dial-up data sets and not invoked for private line data sets. After the flags are set, the Data Set Initialization routine returns control to the Background routines which thereupon advances the process to step 304 which calls the Executive routine.

Executive Routine

When memory initialization and data set initialization routines are completed and the self-test programs have been executed, the system is prepared to operate as the desired data set type. The microprocessor 124 now invokes the Executive routine 304 and is now prepared to provide three broad functions. One of these broad functions is to interact with telephone line interface 120 and the common processor 101 to provide line control. More specifically, the microprocessor 124 receives information from the telephone line interface 120 and instructions from the common processor 101 by way of the shared RAM 133 and processes the information and instructions to determine or define the state of the telephone line. The telephone line state information is then passed to the telephone line interface 120 (to control the state of the telephone line) and to the common processor 101.

A second broad function of the microprocessor 124 is to provide interface functions between the DSP 127 and the common processor 101. As described below in further detail, these functions involve accepting incoming data demodulated by the DSP 127, assembling and processing such demodulated data and writing the processed data into the shared RAM 133 for ultimate passage to the common processor 101 and, in the other direction, accessing the shared RAM 133 to obtain outgoing data supplied by the common processor 101 and processing such data for ultimate application to the DSP 127.

As noted above, the microprocessor 124 obtained instructions from the common processor 101 by way of the shared RAM 133 defining the data set type during the data set initialization routine. Accordingly, the microprocessor 124 is now prepared to provide appropriate address information for the external program memory ROM 147 of the DSP 127 and appropriate instructions for the DSP 127 to control the mode and manner that they operate.

A third broad function that the microprocessor 124 is now prepared to provide is to participate with the common processor 101 (by way of the shared RAM 133) to make various sanity tests for determining whether the DSP 127 and shared RAM 133 are operating properly.

These above-described functions are called in by the Executive routine 304, described below, or alternatively called upon by the Interrupt Handler routine or task, also described below. As this point it is only necessary to understand that the functions (or routines) called upon by the Interrupt Handler routine are generally related to those functions involved in the assembling or processing of the incoming data demodulated by the DSP 127 and the outgoing data to be modulated by the DSP.

The flowchart of the Executive routine 304 is shown in FIG. 5. Assuming now that the Data Set Initialization routine 303 of the microprocessor 124 is complete, the Executive routine will be entered at step 306 and advance to decision 307. In decision 307, a determination is made as to whether the common processor 101 has made a call request, as evidenced by an information bit placed by the common processor 101 in the shared RAM 133. Accordingly, to make such determination, the microprocessor 124 accesses the shared RAM 133 and, in the event such a call request has been made, the Executive routine advances to step 308.

In step 308, the Call Originate routine is entered to enable the system to originate a call to a remote system or set, the details of this routine being described hereinafter. When the Originate routine returns control to the Executive routine (for various reasons described hereinafter), the Executive routine advances to step 309. Alternatively, if the microprocessor 124 determines that the common processor 101 is not making a call request at this time, decision 307 advances the Executive routine directly to step 309.

In step 309, the INSUB and OUTSUB routines are successively executed, which routines are described in detail hereinafter. At the termination of the execution of these routines, the Executive routine is re-entered and advances to decision 310.

In decision 310, the microprocessor 124 accesses the shared RAM 133 to determine whether or not the common processor 101 has sent instructions for the DSP 127 to change parameters of the UART. As noted above, these parameter changes might involve an instruction to change the data speed (of the transmitter and/or the receiver) and such change in data speed might also indicate a change of the modulation and demodulation technique, as hereinbelow discussed. In addition, the microprocessor 124 might access a line definition word placed there by the common processor 101 indicating information defining such parameters as character length, length of the stop bit (and/or absence thereof) and type of parity (such as odd or even) or no parity check. In the event that one or the other of the above parameters have been changed, decision 310 advances the Executive routine to step 311 wherein a RESET-UART routine is executed by the microprocessor 124 to modify the parameters of the UART. The Executive routine is re-entered after the RESET-UART routine is complete and advances to step 312. Alternatively, if upon accessing the shared RAM 133, it is determined by the microprocessor 124 that none of these UART parameters have been changed, the Executive routine advances directly to step 312.

In step 312, the Router routine (described hereinafter) is called and upon the return of control to the Executive routine by the Router routine, the INSUB, OUTSUB and Test routines are thereafter executed in succession, which routines are described in further detail hereinafter. After the termination of the Test routine, the Executive routine is re-entered and the routine then loops back to decision 307 and the above-described sequences are then repeated.

It is noted that the Executive routine and all of the various routines and subroutines called upon by the Executive routine can be interrupted by the Interrupt Handler routine or task with the exception that, as noted below, certain of the routines called upon by the Executive routine might include a portion thereof that disables an interrupt for an interval of time.

Router and Line Control Routines

Figure 6:
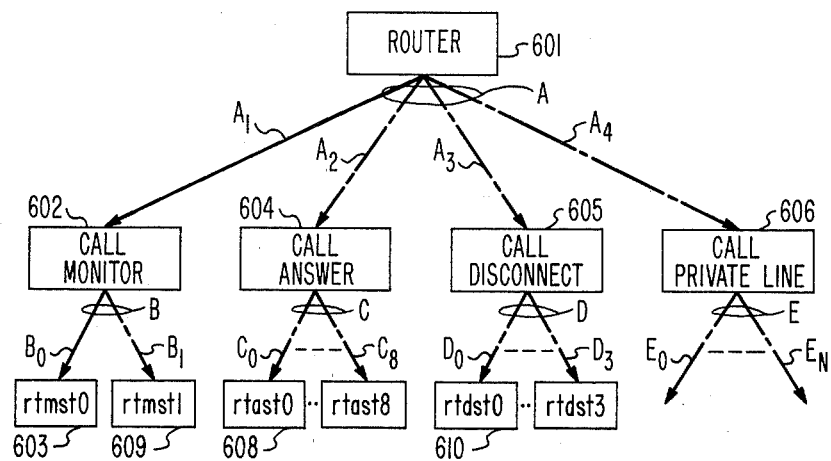
FIG. 6 depicts the flow diagram of the router subroutine of the executive routine.

FIG. 6 depicts a vector analysis of the execution of the Router routine that occurs when the Executive routine calls for the Router routine. This vector analysis shows how the Router routine calls a particular state in a selected subroutine in accordance with the positions of the primary stage state pointer and the various secondary stage state pointers which, in part, as previously described and, in part, as will be described hereinafter, have been and are set to such positions in response to the execution of various other routines and subroutines. In FIG. 6, the primary stage state pointer is symbolicly represented by arrows or vectors A1, A2, A3 and A4, which individually represents each of the four positions that can be assumed by the primary stage pointer. Similarly, vectors B0-B1, C0-C8, D0-D4 and E0-En symbolicly represent the several positions that can be assumed by the four secondary stage state pointers.

If it is assumed that the initialize data set routine, in step 331, has set the primary and secondary stage pointer positions, these positions are symbolically defined by vectors A1 and B0 and the Router routine 601, upon being entered, vectors along arrows A1 and B0 to first the Monitor subroutine 602 and then (in tandem) to the Router Monitor State 0 (RTMST0) 603 in the Monitor subroutine. If it is assumed that the primary stage state pointer is set to another position, the Router routine 601 will vector along another arrow (A2, A3 or A4) to the Answer 604, Disconnect 605 or Private Line 606 subroutine and then to a state in such other routine in accordance with the position of the secondary stage state pointer associated with such other subroutine. In any event, it is to be understood that the state pointers are arraged in two levels, wherein a primary stage is positioned to point to an appropriate subroutine and a secondary stage associated with the subroutine is positioned to point to an appropriate state of the subroutine.

Monitor Routine

Figure 7:
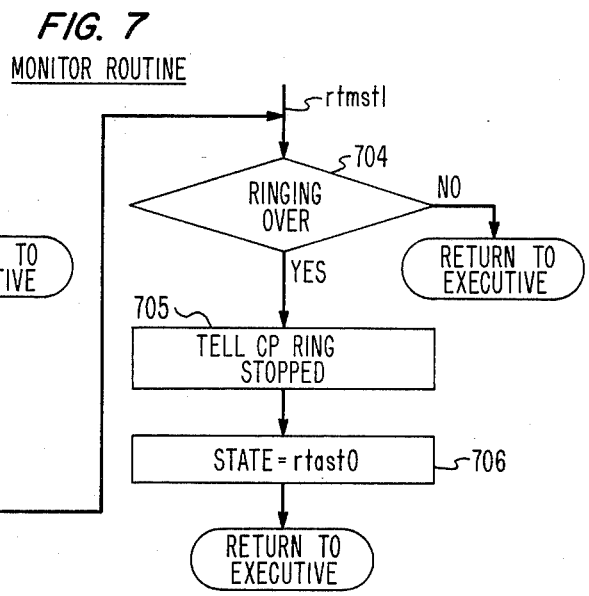
FIG. 7 shows the monitor subroutine of the router routine.

Assume now that the pointers are positioned as described above so that the Router routine 601 vectors to the Router Monitor State 0 (RTMST0) of the Monitor routine 602 (by way of vectors A1 and B0). In state RTMST0, the Monitor routine, as seen in FIG. 7, initially advances to decision 701. In decision 701 of the subroutine, microprocessor 124 detects over leads 123 extending to telephone line interface 120 whether valid ringing is presently being received from the telephone line 102. In the event that valid ringing is not presently being detected, decision 701 returns back to the Executive routine and the Executive routine resumes advancing as previously described. Alternatively, if valid ringing is detected by microprocessor 124, the subroutine advances to step 702.

In step 702 of the Monitor routine, the microprocessor 124 sets a bit in an appropriate address of the shared RAM 133 to advise the common processor 101 that ringing is being received. The subroutine then advances to step 703 and, in step 703, the state of the Router subroutine is set to the Router Monitor State 1 (RTMST1) by setting the secondary stage state pointer associated with the Monitor subroutine to the vector symbolicly represented by arrow B1 in FIG. 6. At the same time, the Monitor subroutine advances to decision 704 and, in decision 704, a determination is made as to whether or not the incoming ringing has terminated. In the event that the incoming ringing is continuing, decision 704 returns to the Executive routine (to await the termination of ringing) and the Executive routine resumes advancing. Alternatively, if the ringing has now terminated, decision 704 advances the Monitor subroutine to step 705. In step 705, an appropriate bit is set in the shared RAM 133 to thereby advise the common processor 101 that the ringing has terminated. The subroutine thereupon advances to step 706 and, in step 706, the primary and secondary stage pointers are repositioned to point to Router Answer State 0 A(RTAST0) 608 in the Answer subroutine as symbolicly represented by arrows A2 and C0 in FIG. 6. The subroutine thereupon returns to the Executive routine.

Upon the return of the process from the Monitor subroutine (FIG. 5) to step 312 of the Executive routine, the various steps and decisions in the Executive routine are performed (starting with calling the routine in step 312) and, after completing step 312, returning to step 307, and cycling back to step 312, as previously described. In step 312, the Router routine (FIG. 6) is again called and the Router routine vectors to the appropriate state in the appropriate subroutine in accordance with the positioning of the primary and secondary stage state pointers. For example, if the pointers are positioned to vector along arrows A1 and B1 (as seen in FIG. 6), the Router routine will vector to state RTMST1 (609) of the Monitor subroutine to advance the subroutine to step 704 (FIG. 7). The subroutine then proceeds in the same manner as described above, starting here at step 704.

Answer Routine

Figure 8:
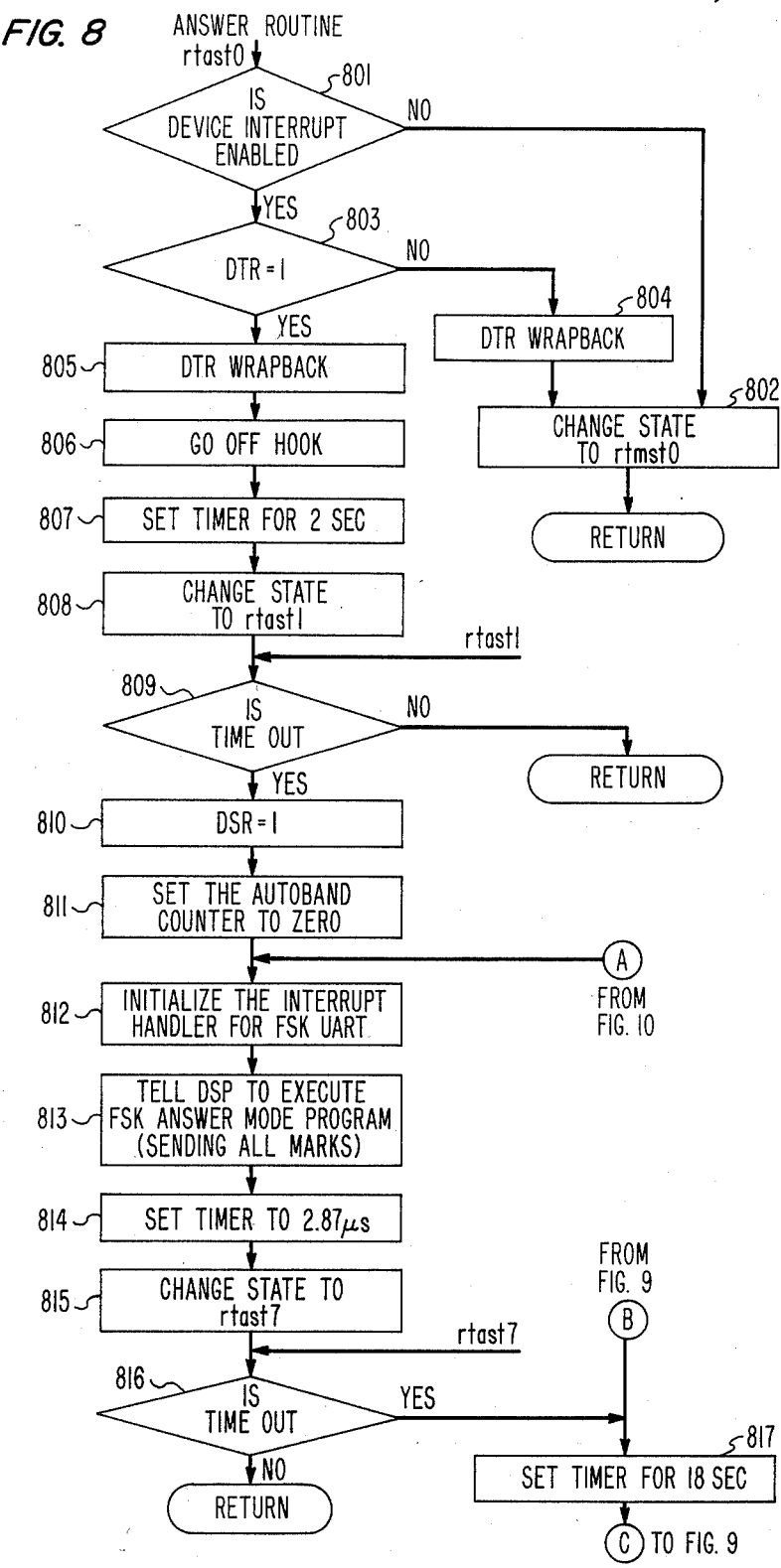
FIGS. 8, 9 and 10, when vertically aligned, disclose the flow diagram of the answer subroutine of the router routine.

Assume now that the pointers are positioned to vector along arrows A2 and C0 to state RTAST0 (608 in FIG. 6). Upon the return to the Router routine, the routine vectors along arrow A1 to the Answer subroutine (604) and then along arrow C0 to state RTAST0 (608). As seen in FIG. 8, when the Answer subroutine is in state 0, it is entered at decision 801. In decision 801, the microprocessor 124 accesses the shared RAM 133 to determine whether or not the common processor 101 has sent a "device interrupt enabled" instruction, which instruction indicates that the common processor 101 has been advised that incoming ringing has been received and has decided to answer the call.

Assume now that the common processor 101 has not provided a "device interrupt enabled" instruction. The subroutine thereupon advances to step 802 wherein the state pointers are set to vector along arrows A1 and B0 to point to Router Monitor State 0 (603 in FIG. 6) and control is returned to the Executive routine (FIG. 5). Accordingly, when the Executive routine again cycles back to the Router routine, step 701 of the above-described Monitor subroutine will be entered.

Assume now that the microprocessor 124, upon accessing the shared RAM 133, determines that the "device interrupt enabled" instruction has been placed there by the common processor 101. Decision 801 will thereupon advance the subroutine to decision 803 and the microprocessor 124 will again access the shared RAM 133 to determine if the "data terminal ready" instruction has been placed in the memory by the common processor 101. If the instruction has not been placed in the shared RAM 133, decision 803 advances the subroutine to step 804 which inserts a "data terminal not ready" word in the shared RAM 133 to advise the common processor 101 that this is the instruction presently in the processor memory. The subroutine then returns to step 802 to change the state pointer positions to point to state RTMST0, as described above, and to return control to the Executive routine.

Assume now that a "data terminal ready" instruction has been placed in the shared RAM 133 by the common processor 101. In this event, decision 803 advances the subroutine to step 805. In step 805, a "data terminal ready" word is placed in the shared RAM 133 to advise the common processor 101 that this instruction is presently in the processor memory. The subroutine then advances to step 806 where an "off-hook" signal is sent to the telephone line interface 120. Thereafter, in step 807, a two-second timer is set to insure that there will be a delay interval before further line signaling to permit conventional housekeeping functions (such as billing) to be performed by the common carrier. The subroutine then advances to step 808 where the secondary stage pointers associated with the Answer subroutine is positioned to vector along arrow C1 (not shown) to point to state RTAST1 (not shown). The subroutine then advances to decision 809 where a determination is made as to whether the two-second timer has timed out. In the event that it has not timed out, control is returned to the Executive routine and, when the Executive routine recycles back to the Router routine, the Answer subroutine is re-entered at decision 809 as shown in FIG. 8.

Assume now that the two-second timer has timed out. Decision 809 will thereupon advance the subroutine to step 810. In step 810, the "data set ready" flag is placed in the shared RAM 133 to advise the common processor 101 that the LSP is ready to communicate. The subroutine then advances to step 811 to reset an "autobaud" counter to zero. This "autobaud" counter is utilized to define the number of attempts that have been made to determine the signaling speed of the calling data set and will provide a control function described in further detail hereinafter. With this counter now set to zero, the subroutine advances to step 812 and the Interrupt Handler routine (described in detail hereinafter) is initialized to execute the UART appropriate for FSK signaling. The subroutine then advances to step 813 and, in this step, an address of an instruction set in external program memory 136 is applied to lead 147, which instruction set invokes instructions for DSP 127 to transmit signals in an upper frequency band and receive FSK signal in a lower frequency band. At the same time in step 813, microprocessor 124 sends a sequence of control signals to lead 131 to select a first instruction which enables DSP 127 to initially send all marks using FSK signals to lead 128 and therefore send all marking FSK signals to telephone line 102. The routine then advances to step 814 to set a 287 microsecond timer to allow the DSP to begin execution of its program in response to this sequence of instructions from the microprocessor 124. The subroutine then advances to step 815 where the second stage pointer associated with the Answer subroutine is positioned to vector along arrow C7 (not shown in FIG. 6) to point to the RTAST7 state (not shown). The subroutine then advances to decision 816.

In decision 816, a determination is made as to whether the 287 microsecond timer has timed out. In the event that the timer has not yet timed out, control is returned to the Executive routine. When the Executive routine recycles back to the Router routine which vectors to the RTAST7 state, the Answer subroutine is entered at decision 816. At this time, if the 287 microsecond timer has timed out, decision 816 advances the subroutine to step 817. In step 817, an 18-second timer is set to permit the calling data set ample time to send carrier. The subroutine then advances to step 818 where the secondary stage pointer associated with the Answer subroutine is positioned to point to state RTAST2 and the subroutine then advances to decision 819.

Figure 9:
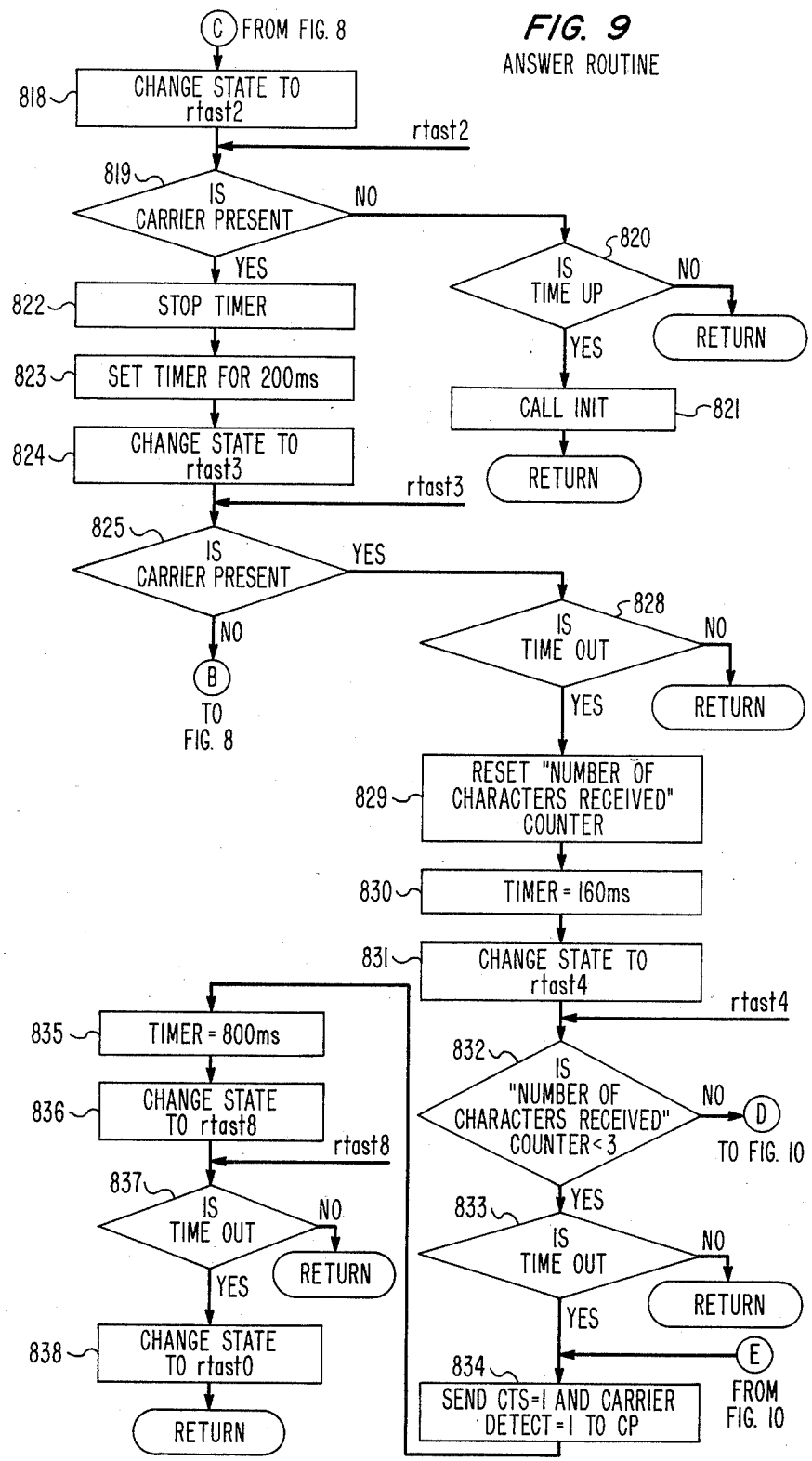

In decision 819, the microprocessor 124 monitors the "carrier present" bit of the data word placed in the storage register 134 by the DSP 127. If incoming carrier is not detected by the DSP and the "carrier present" bit therefore indicates absence of incoming carrier, decision 819 advances the subroutine to decision 820 where a determination is made as to whether the 18 second timer has timed out. If the 18 second timer has not timed out, control is returned to the Executive routine and, when the Executive routine returns to the Router routine, the Answer subroutine is re-entered at decision 819 (as seen in FIG. 9). Alternatively, if decision 820 determines that the 18 second timer has timed out, the subroutine is advanced to step 821 and, in step 821, control is given to the Initialize Data Set routine and the data set is re-initialized and, as previously described, the state pointers are reset.

Assume now that decision 819, upon examining the "carrier present" bit, determines that carrier is being received from the originating or calling data set. In this event, the subroutine is advanced to step 822 wherein the 18 second timer operation is terminated. In step 823, a 200 millisecond timer is then set and, in step 824, the secondary stage state pointer associated with the Answer subroutine is positioned to vector along arrow B3 (not shown in FIG. 6) to point to state RTAST3. The subroutine is then advanced to decision 825.

At this point, a determination is made as to whether carrier is present for the 200 millisecond interval. Accordingly, at this time, the microprocessor 124 examines the "carrier present" bit and, if incoming carrier is no longer present, decision 825 advances the subroutine back to step 817. At step 817, as previously described, the 18 second timer is again set, the secondary stage state pointer is positioned to point to state RTAST2 and the "carrier present" bit is again examined in decision 819.

Assume now that, in decision 825, it is determined that incoming carrier is still being received and that the "carrier present" bit is in the present data word placed in storage registers 134 by the DSP 127. In this case, decision 825 advances the subroutine to decision 828. In decision 828, a determination is made as to whether the 200 millisecond timer has timed out. In the event that the timer has not yet timed out, control is returned to the Executive routine and, when the Executive routine advances back to the Router routine, the routine "vectors" to state RTAST3 and the Answer subroutine is re-entered at decision 825. This looping is continued so long as incoming carrier is being received and the 200 millisecond timer has not timed out. When the timer has timed out, however, decision 828 advances the subroutine to step 829.

In step 829, a "number of characters received" counter is reset. This counter is advanced each time a start bit is detected in the incoming data. At this time, if the originating data set is sending "all marking" FSK signals, it is presumed that, with the possible exception of an occasional error or glitch, no start bits will be detected and the "number of characters received" counter will not be advanced. Alternatively, if the originating data set is sending DPSK signals, these signals are normally scrambled and the DSP 127, which is presently demodulating incoming data using an FSK algorithm, will recognize simulated start bits and the "number of characters received" counter is thereby advanced by each such received "start" bit. In either event, the subroutine advances to step 830, a 160 millisecond timer is set and, in step 831, the secondary stage state pointer is positioned to point to state RTAST4 (not shown).

The subroutine now advances to decision 832 to determine whether the "number of characters received" counter has advanced to a count equal to or greater than three. If the count is less than three, decision 832 advances the subroutine to decision 833 to determine whether the 160 millisecond timer has timed out. If it has not timed out, decision 833 returns control to the Executive routine and, when the Executive routine returns to the Router routine, the routine "vectors" to state RTAST4 and the Answer subroutine is re-entered at decision 832 (as seen in FIG. 9).

If "all marking" FSK signals are received from the calling data set for the 160 millisecond interval, the "number of characters received" counter is less than three when the 160 millisecond timer times out. In this event, decision 833 advances the subroutine to step 834. Accordingly, in step 834, a "clear to send" bit and a "carrier detect" bit are placed in the shared RAM 133 to advise the common processor 101 that incoming carrier is being received from the line and that it is appropriate at this time to send data. The subroutine then advances to step 835 and an 800 millisecond timer is set, which timer will be used to insure that 800 milliseconds of "all marking" is sent to the originating data set. The subroutine then advances to step 836 where the secondary stage state pointer associated with the Answer subroutine is positioned to vector along arrow C8 to point to state RTAST8. The subroutine then advances to decision 837 to determine whether or not the 800 millisecond timer has timed out. In the event that it has not yet timed out, decision 837 returns control to the Executive routine and the Executive routine, upon recycling to the Router routine, vectors to state RTAST8 and enters the Answer subroutine at decision 837. This cycling is continued until the 800 millisecond timer times out, whereupon decision 837 advances the routine to step 838.

In step 838, the primary and secondary stage state pointers are positioned to vector along arrows A3 and D0 to point to the Router Disconnect State 0 (RTDST0) and control is returned to the Executive routine. The data set at this point is in the "answer" mode arranged to provide FSK signaling, has returned 800 milliseconds to the originating set and is ready to transmit and receive data.

Figure 10:
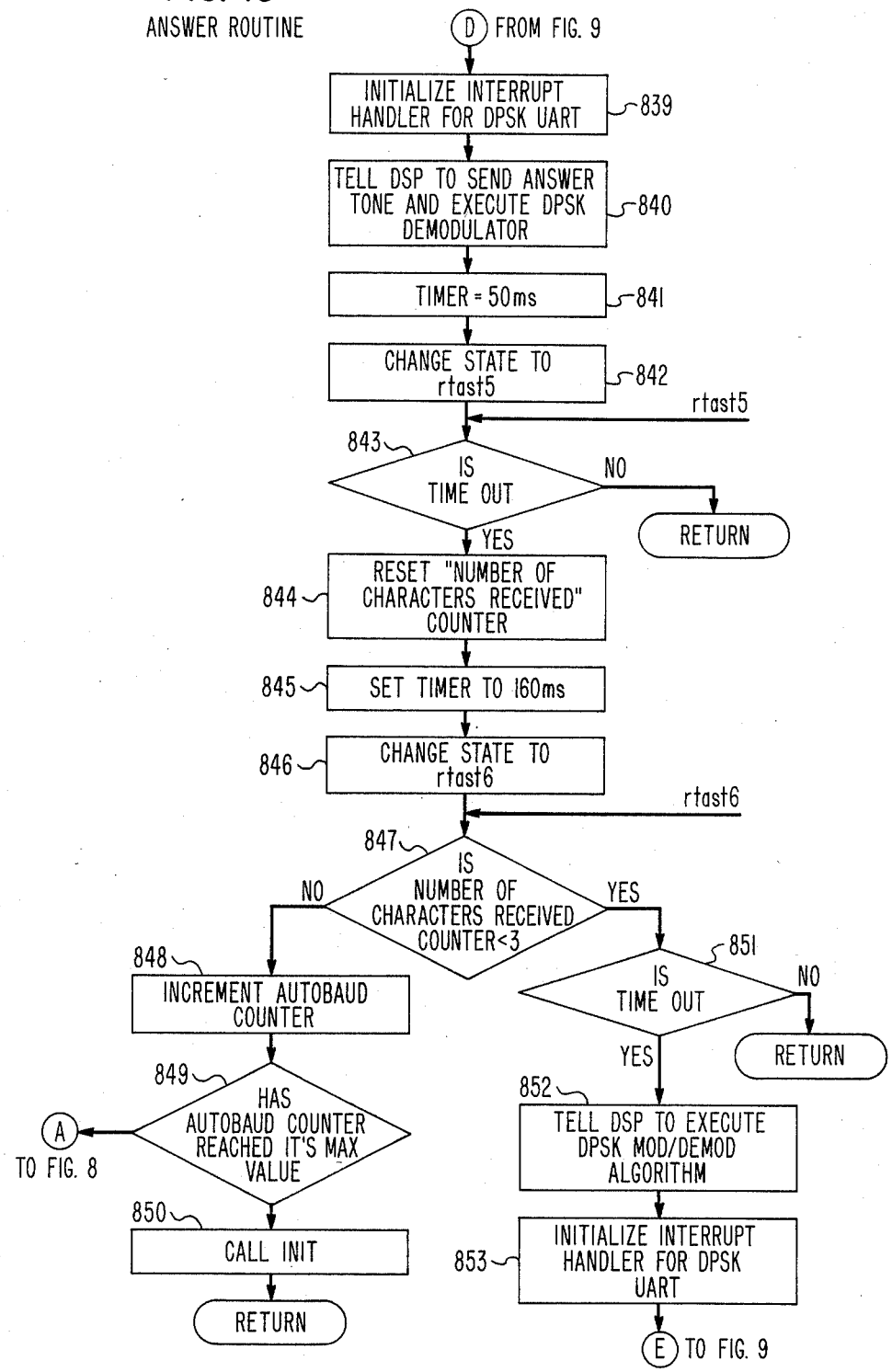

Assume now that in decision 832 it is determined that the "number of characters received" counter has advanced to a count of three or greater. This will occur, as previously noted, when DPSK scrambled signals are received and simulated start bits are detected. In this event, decision 832 advances the subroutine to step 839 (FIG. 10). In accordance with step 839, the Interrupt Handler routine described hereinafter is initialized to handle the DPSK UART. The subroutine then advances to step 840. In step 840, address signals are applied to external program memory 136 via lead 147 to select the instruction sets which will instruct Digital Signal Processor 127 to execute the DPSK demodulation algorithms and to execute the FSK modulation algorithms. A sequence of control signals is sent via lead 131 to DSP 127 to address the first instruction of the set which enables the sending of answer tone whereby DSP 127 proceeds to send steady marking FSK signals to codec 126 thereby applying the steady tone to telephone line 102. The routine then advances to step 841 to set a 50 millisecond timer and to step 842 where the state pointers are reset to point to state RTAST5. After step 842 is executed, the routine advances to decision 843 to determine whether the 50 millisecond timer has timed out. If the timer has not timed out, control is returned to the Executive routine and, when the Router routine is again called, the Answer subroutine is again re-entered at decision 843.

Assume now that the 50 millisecond timer has timed out (thereby giving the DSP adequate time to start up again in view of the change in control signals being sent in step 840). In this event, decision 843 advances the subroutine to step 844 where the "number of characters received" counter is reset. In step 845, a 160 millisecond timer is set and the subroutine advances to step 846 where the state pointers are reset to point to state RTAST6. The subroutine then advances to decision 847.

At this point of time, the DSP is demodulating the incoming DPSK signal, passing the demodulated baseband signals (which presumably are scrambled bits) to storage registers 134 and microprocessor 124 is obtaining the bits and descrambling the bits as described hereinafter.

If the originating data set, at this time, is sending DPSK signals which, during this handshaking interval is presumably all marking and scrambled, no start bits (with the exception of periodic glitches) are being detected and the "number of characters received" counter is not being advanced. Alternatively, if the originating data set is sending FSK signals, for example, the bits, if descrambled, constitute a substantial number of space bits which are detected at start bits and the "number of characters received" counter is substantially advanced. Assuming the latter situation, the "number of characters received" counter is equal to or exceeds three and decision 847 advances the process to step 848. In step 848, the "autobaud" counter is incremented and, in step 849, it is determined whether the "autobaud" has reached a predetermined maximum value. If this maximum value has not been reached, decision 849 advances the subroutine back to step 812 to again initialize the Interrupt Handler routine to execute an appropriate FSK UART routine and the process then proceeds in the same manner through the subsequent steps, as previously described. Alternatively, in decision 849, if the maximum count for the "autobaud" counter has been reached, decision 849 advances the subroutine to step 850. In step 850, the initialized data set routine is called and control is then passed back to this routine to again initialize the parameters of the data set.

Assume now that decision 847 determines that the number of characters received are less than three. Decision 847 thereupon advances the routine to decision 851 and, in this decision, it is determined whether the 160 millisecond timer has timed out. If the timer has not yet timed out, decision 851 returns control to the Executive routine. When the Executive routine again advances to the Router routine, the Answer subroutine is entered at decision 847. Alternatively, if the 160 millisecond timer has timed out (it being recalled that during this interval less than three characters have been detected), the process is advanced to step 852.

In step 852, microprocessor 124 applies address signals to external program memory 136 via leads 147 to select sets of instructions that arranges Digital Signal Processor 127 to send DPSK signals in an upper signaling hand and receive DPSK signals in a lower band. Microprocessor 852 also applied control signals to DSP 127 via lead 131 to invoke the first instruction in the selected sets whereby the DSP now executes the DPSK modulation/demodulation algorithms for an answering data set. The routine then advances to step 853 to initialize the Interrupt Handler routine to execute the DPSK UART routine and the Answer subroutine then advances on to step 834. As previously described with respect to step 834, common processor 101 is advised that carrier is being received and that it is appropriate to send data. The primary and secondary stage pointers are positioned to point to Router Disconnect State 0 and the data set is now arranged to be in the Answer mode and provide DPSK signaling.

Disconnect Routine

Figure 11:
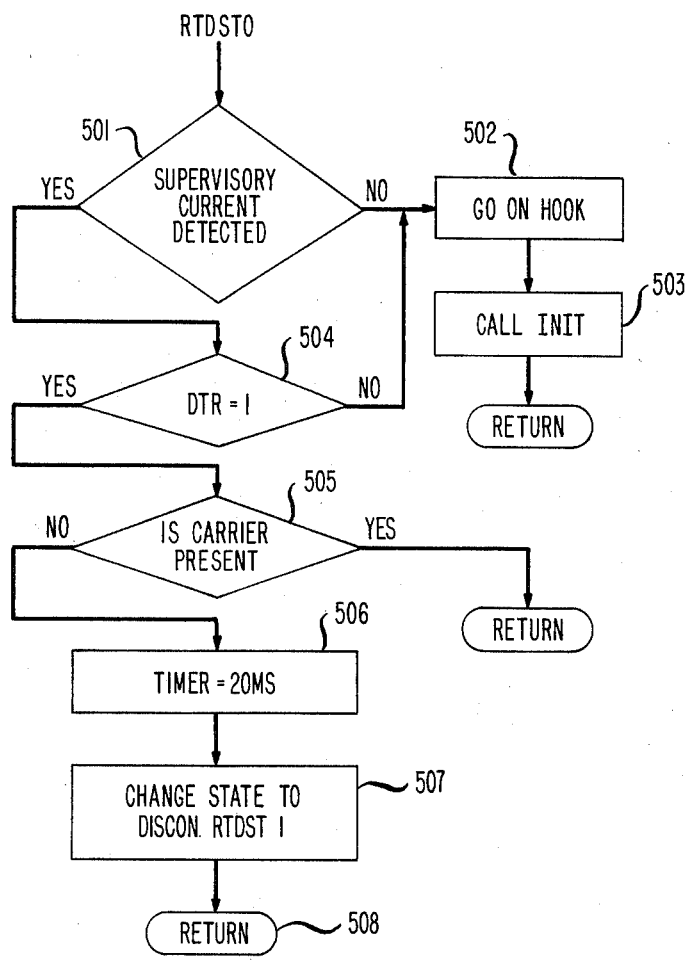
FIGS. 11 and 12 disclose the disconnect subroutine of the router routine.

Disconnect routine 605 (FIG. 6) is entered as previously described when the Line Control routine vectors from Router routine 601 along arrow line A3 to Disconnect routine 605. Assume now that the primary stage state pointer is positioned to vector along arrow A3, as described above, and the secondary stage state pointer is positioned to vector along arrow D0. The Disconnect routine vectors to state RTDST0 which is symbolically represented by block 610. The DISCON (disconnect) routine thereupon enters at decision 501, as seen in FIG. 11. In decision 501, microprocessor 124 determines whether or not the supervisory or line current is flowing in telephone line 102 by examining the supervisory line current port of telephone line interface 120 by way of leads 123. In decision 501, if the line current is not flowing, the routine advances to step 502 and, in step 502, microprocessor 124 signals telephone line interface 120 via leads 123 to go to the "on-hook" state. In step 503, the Initialize Data Set routine is called and the Disconnect routine returns control to the Executive routine, which then calls the INSUB routine (see step 312 in FIG. 5).

Assume now that supervisory current is flowing in telephone line 102. In this event, decision 501 advances the Disconnect routine to step 504. In step 504, microprocessor 124 determines whether or not the data terminal (that is, common processor 101) is ready. More specifically, microprocessor 124 applies an appropriate address to address bus 112 to access that portion of shared RAM 133 which stores the information from common processor 101 as to whether or not it is ready to operate as a data terminal. If common processor 101 has provided a "data terminal ready" signal to shared RAM 133, this signal is transferred by virtue of the address signals on address bus 112 to microprocessor 124 by way of data bus 111 and the Disconnect routine thus advances to decision 505. Alternatively, if the "data terminal ready" signal is not in shared RAM 133, decision 504 advances the routine back to step 502 and, as described above, an on-hook signal is passed to telephone line interface 120 to place the set back on-hook.

The Initialize Data Set routine is called and the Disconnect routine returns control to the Executive routine.

Assume now that the data terminal is ready and the Disconnect routine has advanced to step 505. In step 505, a determination is made as to whether or not incoming carrier is present, this being determined by examining the carrier bit which was internally stored in microprocessor 124 during the Interrupt Handler routine (described below). In the event that the carrier bit indicates that incoming carrier is present, decision 505 returns control to the Executive routine. Alternatively, if the carrier bit indicates that incoming carrier is not present, a 20 millisecond timer is invoked in step 506 and, in step 506, the secondary stage state pointer is advanced to vector along arrow D1 to place the routine in state RTDST1. The DISCON routine then returns control to the Executive routine.

Figure 12:
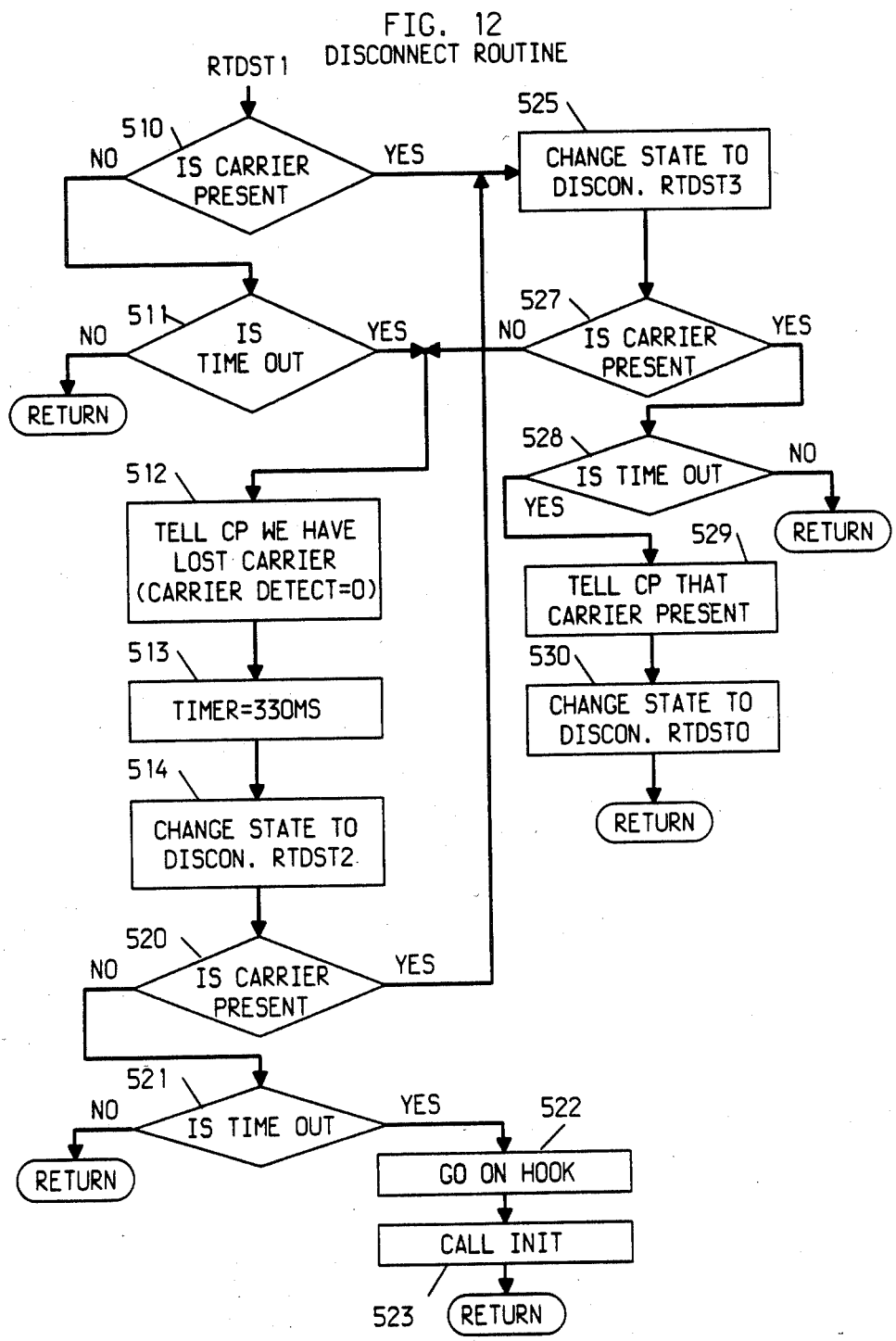

Assume now that the DISCON routine is again entered and, at this time, the primary and secondary stage state pointers point to vectors A3 and D1. Consequently, the DISCON routine is in state RTDST1 and is thus entered at decision 510 (FIG. 12). In decision 510, which is substantially identical to decision 505, a determination is made as to whether incoming carrier is now present. Assuming that the carrier is not present, the routine advances to decision 511. Decision 511 determines whether or not the 20 millisecond timer has timed out. If the timer has not timed out at this time, decision 511 returns control to the Executive routine. It is noted that, at this time, the primary and secondary stage state pointers still vector along arrows A3 and D1 and, when the DISCON routine again regains control, it will start at state RTDST1 and enter at decision 510 and this loop will continue so long as carrier is not present and the 20 millisecond timer has not timed out.

Assume now that carrier is not present and the 20 millisecond timer times out. In this event, decision 511 advances the routine to step 512. In step 512, common processor 101 is advised that carrier has been lost or, more specifically, an appropriate address word is applied to address bus 112 and a lost carrier bit is passed to data bus 111 to store a lost carrier indication in shared RAM 133. The routine then advances to step 513 wherein a 330 millisecond timer is invoked and the routine, in step 514, advances the secondary stage state pointer to vector along arrow D2 to place the routine in state RTDST2. The routine advances to decision 520 and a determination is again made as to whether incoming carrier is present. If the incoming carrier is still not present, the routine advances to decision 521 where a determination is made as to whether the 330 millisecond timer has timed out. If the timer has not timed out, control is returned to the Executive routine and the primary and second stage state pointers remain in the same state to vector along arrows A3 and D2. Alternatively, if the 330 millisecond timer has timed out, the routine advances to step 522 wherein microprocessor 124 instructs telephone line interface 120 to go on-hook. In step 523, the "data set initializing" routine is called and the DISCON routine then returns control to the Executive routine.

Assume now that in step 510 it is determined that incoming carrier is present or, alternatively, in step 520 that incoming carrier is present. In either event, the DISCON routine advances to step 525. In step 525, the secondary stage state pointer is advanced to vector along arrow D3 to place the routine in state RTDST3. After the secondary stage state pointer is advanced in step 525, the routine advances to decision 527 where it is again determined whether carrier is present. If carrier is not present, the routine advances to step 512 wherein common processor 101 is advised that carrier has been lost and the routine then proceeds to advance to step 513 and step 514, as described above. Alternatively, in decision 527, if it is determined that carrier is present, the routine advances to decision 528. In decisin 528, a determination is made as to whether or not the 330 millisecond timer has timed out. If the timer has not timed out, decision 528 returns control to the Executive routine, it being recalled that the secondary stage state pointer remains pointing along arrow D3. Alternatively, if the timer has timed out, decision 528 advances the routine to step 529. In step 529, common processor 101 is advised that carrier is present or, more specifically, an appropriate address word is applied to address bus 112 and a carrier present bit is applied to data bus 111 to store the carrier present indication in shared RAM 133. The routine is then advanced to step 530 where the second stage state pointer is reset to vector along arrow D0 and return the routine to state RTDST0 (symbolically shown as block 610 in FIG. 6). The routine then returns control to the Executive routine.

INSUB, OUTSUB, Reset-UART and TEST Routines

As previously noted, the INSUB routine is called by the Executive routine 304 during steps 309 and 312. In general, the INSUB routine transfers characters from shared RAM 133 to an internal character buffer in microprocessor 124. The characters in the internal buffer are then available for the "transmit UART" subroutine which is a portion of the Interrupt Handler routine, described hereinafter. The INSUB routine, which is not shown in the drawings, provides the conventional functions of accessing a flag in shared RAM 133 to determine whether a character is available in shared RAM 133 for transmission to the microprocessor and, assuming that the internal character buffer is unoccupied, providing appropriate address signals to address bus 111 to thereby shift the data bits of the character in shared RAM 133 to the internal character buffer in microprocessor 124 by way of data bus 111. The INSUB routine then resets the flag in shared RAM 133 to designate that the character has been removed and sets a flag in the internal character buffer of microprocessor 124 to indicate that a character is availale therein. The INSUB routine then returns control to the Executive routine which is then entered in either step 309 or step 312.

The OUTSUB routine, which is called after the INSUB routine by the Executive routine in steps 309 and 312, shifts characters from the internal character buffer in microprocessor 124 to shared RAM 133. When a flag in the internal character buffer has been set by the "receive UART" routine, which is a portion of the Interrupt Handler routine, the OUTSUB routine recognizes that a character is available in the buffer and applies appropriate address signals to address bus 112 to write out the character bits to data bus 111 thereby storing the character in shared RAM 133. The internal buffer flag is then reset and a flag in shared RAM 133 is set to designate that a character has been stored in shared RAM 133 and is available to common processor 101. The OUTSUB routine then returns control to the Executive routine which is then entered in either step 309 or 312.

The Reset-UART routine is called by step 311 of the Executive routine. The Reset-UART routine provides a process for making changes for the "transmit UART" and the "receive UART" parameters, which changes are in the form of instructions placed in shared RAM 133 by common processor 101. Examples of UART parameters are, for example, the receiver or transmitter line speeds, the length of the data character, the number of stop bits in the character and the parity type (odd or even parity). In the event that decision 310 of the Executive routine, in its monitoring of UART parameters stored in shared RAM 133, determines that a UART parameter has been changed, the Executive routine advances to step 311 to call the Reset-UART routine. The Reset-UART routine accesses this indicated change as stored in shared RAM 133 to modify the operation of the transmit UART and/or the receive UART. For example, if the receiver or transmitter speed has been changed, it modifies the clock input to the transmit and/or the receive UART. If the character length has been changed, it modifies the number or count provided by the UART bit counter and, correspondingly, if the number of stop bits has been changed, it modifies the number of counts of the stop bit counter.

The Test routine is called during step 312 after the OUTSUB routine returns control to the Executive routine. The Test routine is a conventional process which provides sanity testing of the communication between the microprocessor 124 and common processor 101. More specifically, the Test routine provides a process which is invoked by an appropriate word supplied by common processor 101 to shared RAM 133. The microprocessor, in response thereto, returns a corresponding inverted word to shared RAM 133. Common processor 101 can examine this response to determine whether "error-free" communication exists. The Test routine then returns control to the Executive routine.

Interrupt Handler Routine

Figure 13:
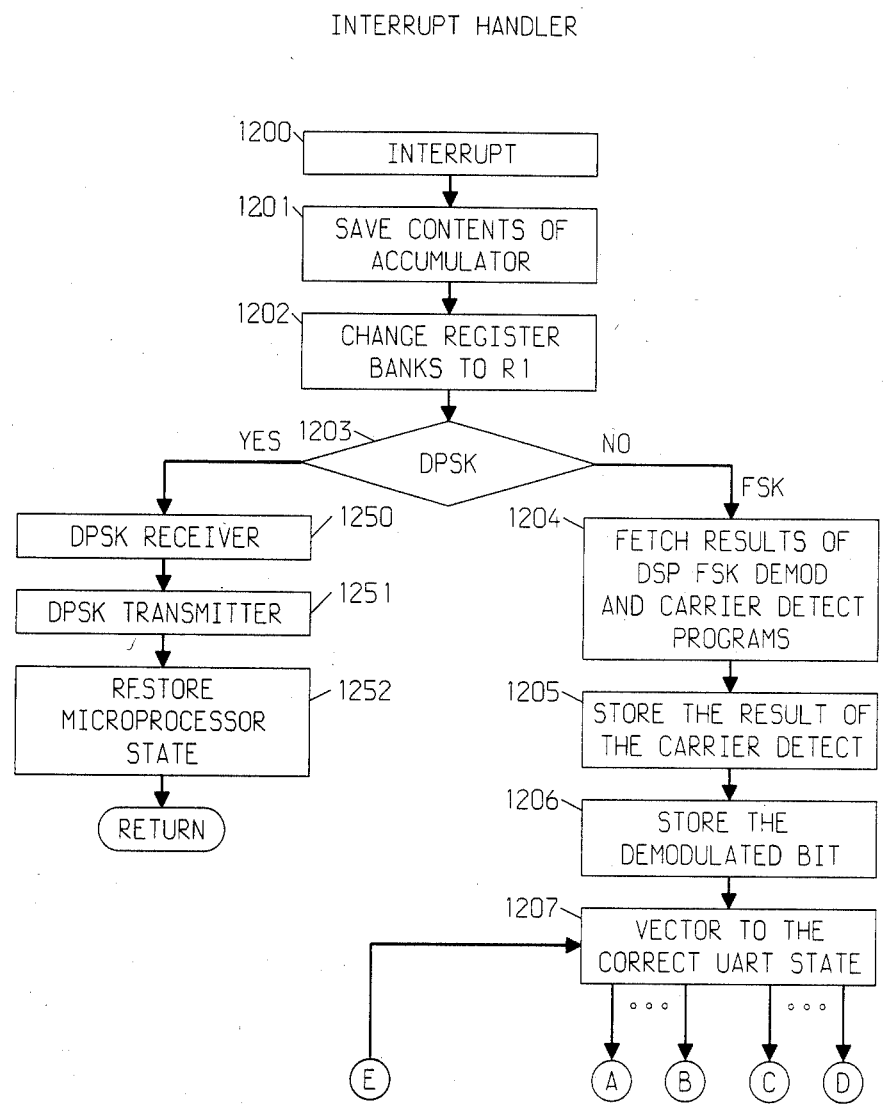
FIGS. 13 and 14 show the interrupt handler routine of the digital processor.

The Interrupt Handler routine is shown in FIG. 13. This routine is entered when an interrupt is received by the microprocessor, which interrupt is provided by the sync clock input, which is passed to microprocessor 124 by gate array 135 via lead 140. Upon the occurrence of this interrupt, the routine presently in progress is interrupted and the Interrupt Handler routine advances to step 1201.

In step 1201, the present contents of the internal accumulator of microprocessor 124 is saved by storing it in internal registers. The routine then advances to step 1202 and, in this step, the register bank designated for reading and storing information is changed. The microprocessor is provided with alternative sets or banks of registers and, in step 1202, reading and storing of information which, prior to the interrupt was directed to a specific one of the register banks, such as register bank "0"; is now directed to an alternative one of the register banks, such as register bank "1". The routine then advances to decision 1203.

In decision 1203, a determination is made as to whether the modem is designated as FSK or DPSK type. This designation can have been made, for example, during step 329 or 330 in the Initialize Data Set routine or, alternatively, can have been made in steps 812 or 839 of the Answer routine or in step 1585 in the Originate routine, described hereinafter.

Assume now that the data set has been designated to be an FSK type by one of the above-described routines. In that event, decision 1203 advances the Interrupt Handler routine to step 1204. In step 1204, the results of Digital Signal Processor 127 demodulation and carrier detect programs are fetched. This is provided by providing an appropriate address to address bus 112 to obtain the FSK and carrier detect information in storage registers 134 by way of data bus 111. In step 1205, the results of the carrier detect information is internally stored by microprocessor 124 and, in step 1206, the demodulated data bit is internally stored by microprocessor 124.

After the carrier detect and data bits are stored in the internal buffer, the Interrupt Handler routine advances to step 1207. In step 1207, the routine is vectored to an appropriate state in the "received UART" subroutine 1209 (FIG. 14) and, when the process loops back, as described hereinafter, the routine is then vectored to an appropriate state in the "transmit UART" subroutine 1219. Initially, the receive UART and the transmit UART are in states symbolically shown as states 1210 and 1220, the routines having previously been placed in these states during steps 329 and 300 in the Initialize Data Set routine or in steps 812 or 839 in the Answer routine or in step 1585 of the Originate routine.

The initial state 1210 represents a subroutine of incremental states which examine the incoming sample from Digital Signal Processor 127 to detect the incoming start bit of the character to time the start bit and sample the approximate bit midpoint. Accordingly, assume that step 1207 vectors the routine to state 1210. The incoming sample is examined in state 1210 and assuming the start bit transition is not detected, the routine is advanced to step 1226 which, without storing any information in the buffer or advancing the receive UART state, loops the routine back to step 1207. Step 1207 then vectors the routine to the appropriate state in the transmit UART subroutine 1219.

If, when step 1207 vectors the routine to the initial state 1210, the start bit transition is detected, step 1207 advances the receive UART state vector to the next incremental step of state 1210. This incremental advance will continue for a predetermined plurality of interrupts until the theoretical midpoint of the incoming start bit is being sampled. At this point, when step 1207 vectors the routine to state 1210, the sample start bit is stored in the buffer by step 1226, the receive UART state vector is advanced to the next successive UART state (which will sample the midpoint of the next character bit) and, as previously described, the routine is looped back to step 1207 to then advance the process to the appropriate transmit UART state.

When the next interrupt occurs and step 1207 advances the routine to the next receive UART state, this next bit is sampled and this continues to occur for each interrupt until the theoretical midpoint of this next bit is reached, whereupon the bit is sampled in an intermediate step corresponding to step 1226 and the receive UART state vector is again advanced. For each interrupt, this intermediate step also loops the routine back to step 1207 to vector the routine to the appropriate transmit UART state. In this manner, the receive UART identifies and samples each of the bits of the incoming sync start stop character at the approximate midpoint until a full character is received, the reception of the final or stop bit being identified by final state 1214. At this point, step 1230 sets a flag in the internal buffer to note that the full character is now stored in the internal buffer and advances the UART state vector back to the initial state 1210.

Turning now to transmit UART 1219, it is recalled that each time step 1207 vectored the routine to the proper state of receive UART 1209 and the routine, in turn, subsequently looped back to step 1207, the step then vectors the routine to the appropriate state of transmit UART 1219. Assume first that transmit UART 1219 is in the initial state which is symbolically shown as state 1220. State 1220 represents a subset of incremental states which initially looks for the flag in the internal buffer to determine whether the INSUB routine has set such flag to designate that an outgoing data character derived from shared RAM 133 is available in the internal buffer. If the flag has not been set, step 1220 advances the routine to step 1235 which simply further advances the routine to step 1241. In step 1241, the saved contents of the accumulator are returned to the accumulator and the pointer to the register bank is returned to its initial state (state R0). The routine then returns to the particular Background routine which was previously running and interrupted by the Interrupt Handler routine.

Assume now that when step 1207 vectors the routine to state 1220, the flag in the internal buffer is detected. In this event, when the routine advances to step 1235, the transmit UART state is vectored to the next incremental state of initial state 1220. In step 1241, the accumulator is again restored and the register bank designation is again returned to the R0 designation.

When the next interrupt occurs and step 1207 vectors to transmit UART state 1220, transmit UART 1219 generates the start bit, advancing the routine to step 1235. In step 1235, the generated start bit is transmitted by way of lead 152 to Digital Signal Processor 127 for ultimate transmission to line 102. The transmit UART state vector is then advanced to the next state (not shown) which will read the next bit from the internal buffer and at the approximate midpoint a step corresponding to step 1235 will send the bit to Digital Signal Processor 127 for ultimate transmission to line 102. This step will also advance the transmit UART vector to the next state to read the next bit of the character. Of course, for each of these interruptions, the routine advances to step 1241 to restore the accumulator and the register bank and return the process to the previously interrupted routine.

In the above described manner, transmit UART 1219 reads the various bits of the character from the internal buffer and these bits are similarly passed to Digital Signal Processor 127 and the transmit UART state vector is similarly advanced. Advantageously, after all of the bits of the character are read from the internal buffer and transmitted, a parity bit is generated by a subroutine in one of the states of transmit UART 1219 and, finally, a stop bit is produced in a final one of the transmit UART states, such as state 1224, and these bits are similarly passed to line 102. After the stop bit is passed to the Digital Signal Processor by step 1240, the transmit state is advanced back to the initial state 1220, the buffer flag in the internal register is reset, step 1241 again restores the accumulator and the register bank pointer and returns the process to the Interrupt routine.

Assume now that, during the Initialize Data Set, Originate or Answer routines, the DPSk mode has been designated or selected. In that event, decision 1203 advances the Interrupt Handler routine to step 1250 (FIG. 13). In step 1250, the DPSK Receive subroutine is called and is executed in a manner described in further detail hereinafter. Thereafter, the routine advances to the DPSK Transmit subroutine 1251 which is executed in a manner described in further detail hereinafter. The execution of these two subroutines provide for the reception of sampling of incoming data and the generation or transmission of outgoing data. After these two subroutines have completed their functions, the Interrupt Handler routine advances to step 1252 and, in step 1252, the state of microprocessor 124 is restored and, more specifically, the pointer for the register bank is returned to its previous state and the contents of the accumulator which was previously saved in step 1201 is returned to the accumulator. The Interrupt Handler routine now returns the process to the routine previously interrupted.

Figure 14:
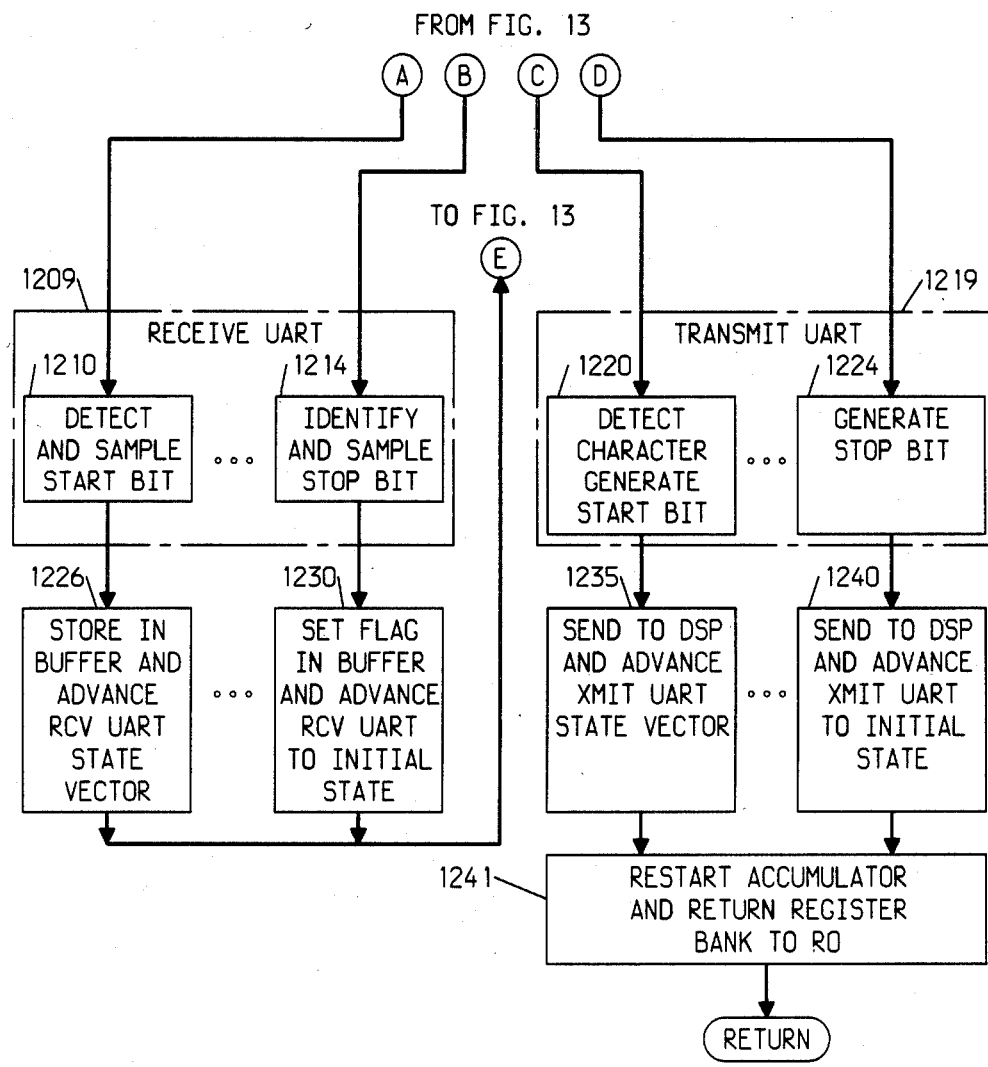
Figure 15:
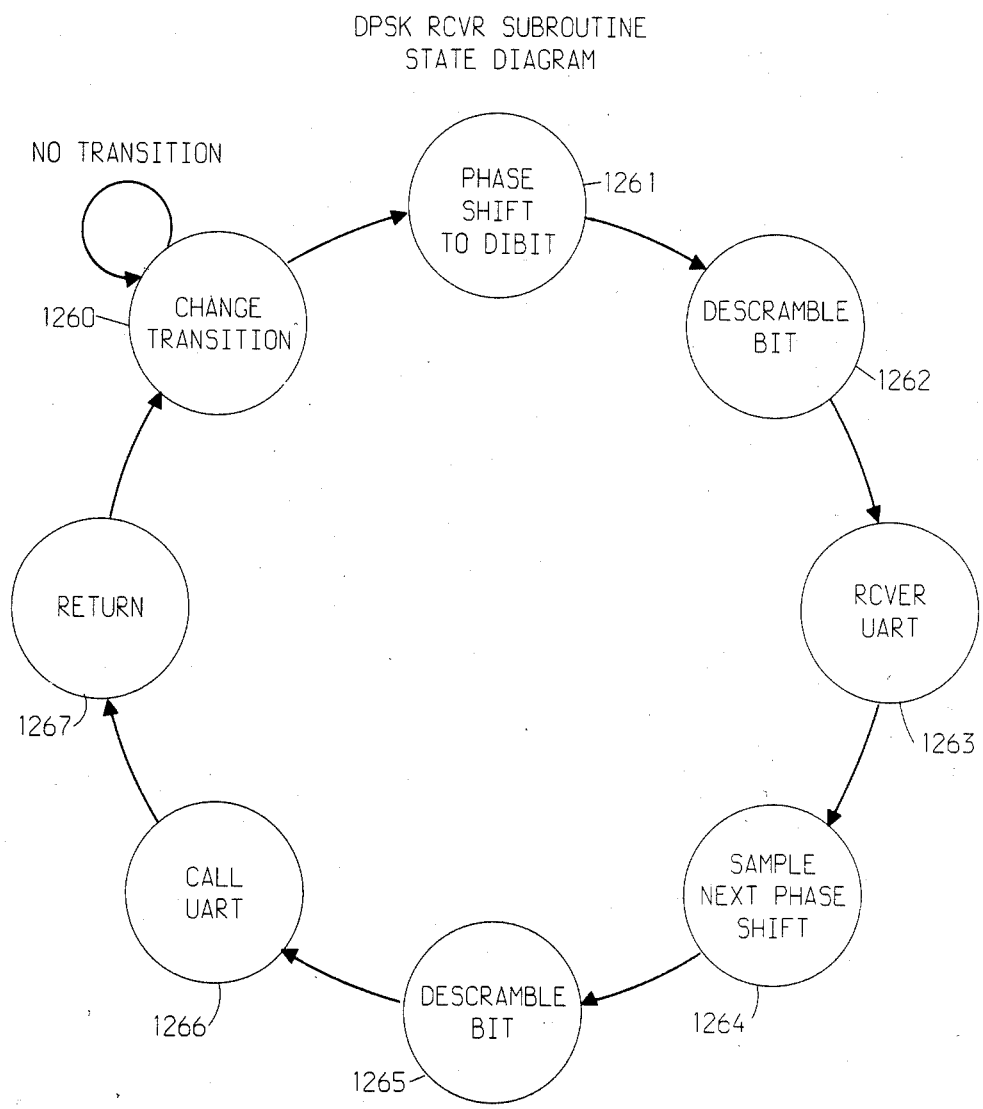
FIG. 15 depicts a state diagram for the DPSK receiver subroutine of the interrupt routine.

FIG. 15 discloses a state diagram of the DPSK receiver subroutine. Each time microprocessor 124 is interrupted by the sync clock, one, and only one, of a plurality of states, identified in FIG. 14, is executed. Assume now that the present state is symbolically represented by state 1260, as shown in FIG. 14. The DPSK receiver subroutine will remain in this state until it detects a positive transition of the recovered clock which, as previously described, is obtained from storage registers 134. Upon detection of the positive transition of this clock, the state of the subroutine is advanced to state 1261, the phase shift to dibit translation state, and this state function is provided for the next interrupt.

In the phase shift to dibit state, state 1261, the phase shift information provided by storage registers 134 is translated to a dibit. The state of the subroutine is then advanced to state 1262, the descramble bit state.

In the descramble bit state 1262, a well-known descrambling algorithm is executed to descramble the incoming bit. A suitable algorithm for descrambling the bit is described in an article entitled "Digital Data Scramblers" by J. E. Savage in the *Bell System Technical Journal*, Vol. 46, Part 1, 1967, pp. 449–487, wherein the tap polynomial h(x) identity shown on page 453 of the article is specifically arranged in this embodiment by the following equality:

$$h(x) = 1 + x^{-14} + x^{-17}.$$

The state of the DPSK transmit subroutine is then advanced to the receiver UART state, which is symbolically shown as state 1263 in FIG. 15.

In the receiver UART state, state 1263, successive bits of the incoming signal are sampled and assembled to create a character in a manner similar to the manner that the bits are sampled and assembled in receive UART subroutine 1209. The state of the DPSK receive UART subroutine is then advanced to the sample next phase shift state, state 1264.

In state 1264, storage registers 134 are read and the contents are stored in an internal register of microprocessor 124. This information will be used in the next cycle of the DPSK receiver subroutine to provide data for state 1261, the phase shift to dibit state. The state of the subroutine is then advanced to a second descramble bit state, state 1265. In this state, the second dibit is descrambled in a conventional manner, such as in the manner previously described in the Savage article. The DPSK receiver subroutine is then advanced to state 1266.

State 1266 constitutes a second receive UART routine similar to the receive UART routine 1209 which constitutes a combination of the sampling and assembling of the incoming data character. The DPSK receiver subroutine is then advanced to return state 1267, which returns the DPSK receiver subroutine back to state 1260. The above described sequence of states is then repeated.

FIG. 15 discloses the DPSK transmit subroutine state diagram. Each time microprocessor 124 is interrupted by the sync clock, one, and only one, of a plurality of states is executed. Assume now that the DPSK transmit subroutine is in state 1270, the "normal" state. The DPSK transmit subroutine will execute this state seven time (for seven interrupts) and then exit the state and proceed to state 1271, the transmit UART state.

State 1271 will sample and assemble incoming bits from registers 134 to form a character much in the same manner that bits are sampled and assembled in transmit UART subroutine 1219. The state of the DPSK transmit subroutine is then advanced to state 1272, the scrambled bit state. In this state, the bit is scrambled in accordance with a well-known algorithm. A suitable method is described in the above-mentioned article of J. E. Savage. The state of the subroutine is then advanced to state 1273, the transmit UART state. In this state, the second bit of the dibit is sampled and assembled in substantially the same manner as the first bit was sampled and assembled in state 1271. The DPSK transmit subroutine is then advanced to state 1274 and in this state, the second bit is scrambled in the same manner as the first bit was sampled in state 1272. The DPSK transmit subroutine is then advanced to state 1275. In state 1275, a mapping is provided from the dibit to the corresponding phase shift and this phase shift information is communicated to the Digital Signal Processor 127 via leads 152. The state of the subroutine is then returned to state 1270, the "normal" state of the subroutine, and the sequence described above is then repeated.

Originate Routine

As described above, the Originate routine is called by the Executive routine in step 308 (FIG. 5) when a call request is made by common processor 101 as evidenced by a call request flag in shared RAM 133 placed there by the common processor. Upon being called, the Originate routine advances to step 1501 (FIG. 16) and, in step 1501, a control signal is sent to telephone line interface 120 by way of leads 123 instructing the interface to go "off-hook". After instructing telephone line interface 120 to go off-hook, the Originate routine advances to step 1502 and, in step 1502, an appropriate address word is applied to leads 147 to select a set of instructions in external program memory 136 which defines the algorithm utilized by Digital Signal Processor 127 to detect incoming dial tone. In addition, instructions are sequentially passed to lead 131 and then by way of input terminal D1 of DSP 127 to read the first line of the instruction set. DSP 127 therefore provides to storage registers 134 a designation as to whether dial tone is being received, as previously described. The Originate routine at this time advances to step 1503 where a two-second timer is initiated.

In decision 1504, the Originate routine determines whether or not the two-second timer has timed out. If the timer has not timed out, the routine loops back to decision 1504 and this loop back continues until the termination of the two-second interval whereupon decision 1504 determines that the timer has timed out and advances the routine to step 1505. In step 1505, another timer is initiated for an interval of seven seconds and the routine is thereupon advanced to decision 1506.

Decision 1506 determines whether or not dial tone is being detected by DSP 127. This determination is made by applying the appropriate address word to address bus 112 to thereby read out the dial tone data bits stored in storage registers 134 by DSP 127. Assume first that microprocessor 124 does not detect the presence of incoming dial tone. In this event, decision 1506 advances the routine to decision 1507. In decision 1507, a determination is made as to whether or not the seven seconds being timed by the timer has timed out. If the timer has not timed out, decision 1507 loops the routine back to decision 1506 and a new determination is made as to whether dial tone is present.

Assume now that dial tone is not present and the seven second timer has timed out. Decision 1507 advances the routine to step 1508. In step 1508, an abandon call and retry (ACR) flag is set in shared RAM 133 to advise the common processor that dial tone has not been detected. Microprocessor 124 in decision 1509 again looks for dial tone and, if it is still not present, advances the routine to decision 1510 which determines whether the call request (CRQ) flag in the shared RAM is still present, that is, whether the common processor is still making the call request. Assume that the common processor is still making the call request, decision 1510 loops the routine back to decision 1509 and a determination is again made as to whether or not dial tone is now present. This looping back will continue until either dial tone is received or the common processor abandons the call.

Assume now in decision 1509 it is determined that the dial tone is still not present and further assume that the common processor has abandoned the call. In this event, decision 1510 advances the routine to step 1511. In step 1511, the abandoned call and retry (ACR) flag in the shared RAM is reset. In addition, a data line occupied (DLO) flag and a present next digit (PND) flag are also reset in the event that these flags were previously set for reasons described hereinafter. The routine then advances to step 1512 which calls the Initiate Data Set routine and the Originate routine then returns control to the Executive routine.

Figure 17:
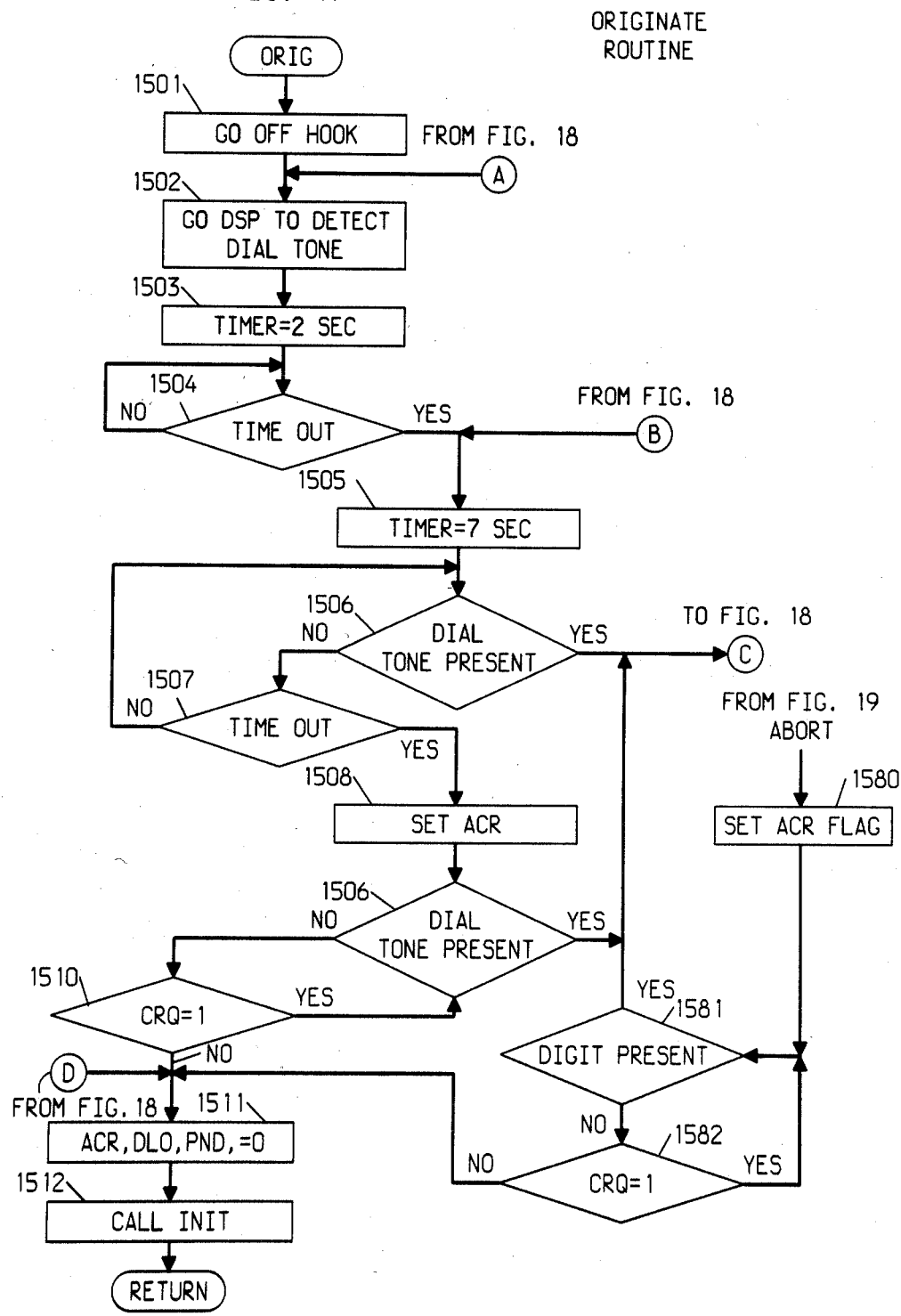

Assume now that incoming dial tone is presently being received by Digital Signal Processor 127 and that decision 1506 determines that the dial tone present bit has been placed in storage registers 134 or, alternatively, that decision 1509 determines that the dial tone present bit has been placed in the storage registers. In either of these events, the Originate routine advances to step 1514 (FIG. 17) and, in this step, a 155 millisecond timer is initiated. This later timing function is to insure that dial tone remains present for at least the 155 millisecond period. The routine thereupon advances to decision 1515 to again determine whether dial tone is present and, if the dial tone is not present (for the 155 millisecond period), the routine loops back to step 1505 where the seven second timer is again started up and the process again looks for dial tone (in decision 1506). Alternatively, in decision 1515, if it is determined that dial tone is present, the routine advances to decision 1516 which determines whether or not the 155 millisecond timer has timed out. If the 155 millisecond timer has not timed out, decision 1516 loops the routine back to decision 1515.

Assume now that the 155 millisecond timer has timed out and dial tone has been received for this interval of time. In this event, decision 1516 advances the routine to step 1517. In step 1517, the data line occupied (DLO) and the present next digit (PND) flags are set by sending appropriate words via address bus 112 and data bus 111 to shared RAM 133. Thereafter, a 10 millisecond timer is set in step 1518. The routine thereupon advances to step 1519. In step 1519, the ACU word is read out of shared RAM 133. This ACU word includes the digit present (DPR) flag designating that a digit is present in the shared RAM, the call request (CRQ) flag designating that the common processor is still requesting that a call be made and the four bits of each dialing digit.

After reading out the ACU word, the routine then advances to decision 1520. In decision 1520, microprocessor 124 determines whether the digit present (DPR) flag has been set to "1" in shared RAM 133, the flag being set to "1" when a digit has been inserted in shared RAM 133 by the common processor 101. Assuming that a digit has not been inserted in shared RAM 133 and the DPR is not set to "1", the routine advances to decision 1521. In decision 1521, a determination is made as to whether or not the call request (CRQ) flag is "0" in shared RAM 133 designating that the call has been abandoned by common processor 101. If the call has been abandoned and the CRQ flag is "0" in shared RAM 133, decision 1521 advances the routine to step 1511. As previously described, step 1511 resets the ACR, DLO and PND flags to "0" and, in step 1512, the Initiate Data Set routine is called and the Originate routine returns control to the Executive routine.

Assume now that the common processor has not abandoned the call. Decision 1521, in this event, advances the routine to decision 1524. In decision 1524, a determination is made as to whether the 10 millisecond timer has timed out. If the timer has not timed out, decision 1524 loops the routine back to step 1519, the ACU word is again obtained from the shared RAM and a determination is again made in decision 1520 as to whether the DPR is set to "1" in shared RAM 133. Assume now that in decision 1520 it is determined that the DPR flag is set to "1". Decision 1520 thereupon advances the routine to step 1526. In step 1526, the most significant bit of the digit in the ACU word is returned to common processor 101 by sending the bit to shared RAM 133 to provide confirmation that the digit has been obtained. The routine then advances to decision 1527 and, in decision 1527, it is determined whether or not the last or end-of-number (EON) digit is in the ACU word. If the digit in the ACU word does not constitute the end-of-number digit, the routine advances to decision 1528 where a determination is made as to whether the digit in the ACU word constitutes the "request to wait for second dial tone" digit. If this second dial tone digit is in the ACU word, decision 1528 advances the routine to step 1529 and, in step 1529, the present next digit (PND) flag is set to "0" and the routine loops back to step 1502 and the routine then proceeds to look for the second dial tone and the second dial tone digit (or digits) in the same manner as the routine looked for the first dial tone and the dialing digits.

If the digit in the ACU word does not constitute the end-of-number digit and is not the second dial tone digit, decision 1528 advances the routine to decision 1530 (FIG. 18). In decision 1530, it is determined whether an invalid digit (such as digits 10, 11, 14 or 15) is in the ACU word. If the digit is invalid, decision 1530 advances the routine to step 1531 to set the ACR flag in shared RAM 133. After the ACR flag is set, the routine then advances to step 1532.

If the digit does not constitute an invalid digit, decision 1530 advances the routine to step 1533. In step 1533, microprocessor 124 instructs Digital Signal Processor 127 to send an appropriate multifrequency dialing signal digit as defined by the digit in the ACU word. More specifically, microprocessor 124 selects the appropriate instruction set in external program memory 136 by way of lead 147, sends the appropriate control sequence over lead 131 to input terminal D1 of Digital Signal Processor 127 and sends the appropriate input bits over leads 152 to input terminals C0, 1 of DSP 127. The routine then advances to step 1532.

In step 1532, the PND flag is reset. After the PND flag is reset, the routine is advanced to step 1534 where a 50 millisecond timer is initiated. In decision 1535, the routine determines when the 50 millisecond timer times out, looping back if the timer has not timed out and advancing to step 1536 upon time out.

When the Originate routine advances to step 1536, the multifrequency dialing signals previously "turned on" in step 1533 is now turned off or, more specifically, Digital Signal Processor 127 is instructed to terminate the sending of the multifrequency dialing signal digit defined by the digit in the ACU word. The routine then advances to step 1537.

In step 1537, a 50-millisecond timer is turned on and the routine advances to decision 1538. Decision 1538 determines whether the 50-millisecond timer has timed out, looping back if the timer has not timed out and, alternatively, advancing to decision 1539 when the timer in fact does time out.

In decision 1539, a determination is made as to whether the digit present flag is reset. Presumably, when the present next digit flag was reset in step 1532, common processor 101, during the 50-millisecond delay period, resets or restores to zero the digit present flag it had placed in shared RAM 133. Thereafter, when the next digit is passed to shared RAM 133 by the common processor, the digit present flag is again set or restored.

Assume first that the digit present flag has been reset and the next digit is not yet present in shared RAM 133. Decision 1539, determining that the digit present flag is reset, advances the routine to decision 1560. In decision 1560, a determination is made as to whether the call request flag is still set indicating that a call has not been abandoned by common processor 101. If, in fact, the call has not been abandoned, decision 1560 loops the decision back to decision 1539. Alternatively, if the call has been abandoned and the call request flag has been lowered in shared RAM 133, decision 1560 advances the routine to step 1511 and the call is thereupon terminated in the same manner as previously described by restoring all of the flags, by calling the Initiate routine in step 1512 and by returning to the Background routines.

Assume now in decision 1539 it is determined that the digit present flag is high or set and the next digit is therefore present in shared RAM 133. In this event, decision 1539 loops the routine back to step 1517. In step 1517, the DLO and PND flags are again set and microprocessor 124 will proceed to re-examine the digit present flag and, assuming the flag is still high, obtain the next digit presented by common processor 101. In this manner, the various digits of the called or addressee station are sequentially presented to microprocessor 124 which, in turn, instructs Digital Signal Processor 127 to transmit the appropriate or proper multifrequency dialing signals out onto line 102.

Assume now that the final digit has been sent by common processor 101. In this event, when decision 1527 is reached, a determination is made that the digit previously sent constituted the last or final digit and the present digit presented in shared RAM 133 is a special digit designating that the final digit was previously transmitted. In this event, decision 1527 advances the routine to step 1570. Alternatively, assume that the digit present flag, after dropping down, is not again set. In this other event, decisions 1520, 1521 and 1524 determining that a new digit is not being presented after an appropriate interval of time, advance the routine to step 1570. In either of these events, when the routine advances to step 1570, a 7-second timer is set and the routine advances to decision 1571.

In decision 1571, microprocessor 124 determines whether Digital Signal Processor 127 is reading incoming answer tone being received on line 102. If answer tone is not being received, the routine advances to decision 1572 and decision 1572 loops the routine back to decision 1571 if the 7-second timer has not timed out.

Figure 16:
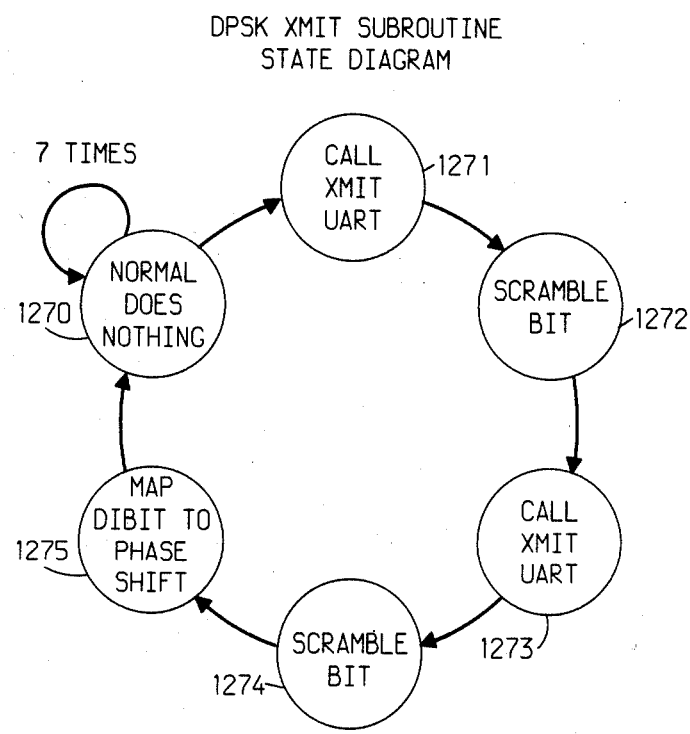
FIG. 16 depicts a state diagram for the DPSK transmitter subroutine for the interrupt routine, and FIGS. 17, 18, 19 and 20 disclose the flow diagram for the originate subroutine for the executive routine.

Assume now that the 7-second timer has timed out and answer tone is still not being received. Decision 1572 thereupon advances the routine to step 1580 (FIG. 16). In step 1580, the abandoned call and retry (ACR) flag is set by microprocessor 124 in shared RAM 133. The routine advances to decision 1581 and, in decision 1581, the digit present flag is again examined. If the digit present flag is now set, the routine advances to step 1518 and the routine again looks for another digit. Of course, if another digit is not present or this had been the last digit, this simply loops the routine from decision 1527 or 1524 on back to step 1570 and this looping will continue so long as answer tone is not present and the digit flag is set.

Assume now that the digit flag is no longer set. Decision 1581 advances the routine to decision 1582 and a determination is made as to whether the call request flag is up. If the call request flag is still up, decision 1582 loops the routine back to decision 1581. If the call request flag has been taken down, however, decision 1582 advances the routine to step 1511. As previously described, in step 1511, the various flags are reset, the Initiation routine is called and the Originate routine returns the process to the Background routines.

Assume now that decision 1571 determines, after the last digit has been transmitted, that answer tone is now present on line 102. The routine thereupon advances to step 1573 to initiate a 20-millisecond timer. Decision 1574 then looks for answer tone to assure that a momentary answer tone simulation was not present on line 102. If this glitch was not present, decision 1574 loops the routine back to step 1570, the 7-second timer is set and Digital Signal Processor 127 is again examined for answer tone on line 102. Alternatively, if answer tone, in fact, was on line 102, decision 1574 advances the routine to decision 1575 and the latter decision determines whether or not the 20-millisecond timer has timed out. If the timer has not timed out, decision 1575 loops the routine back to decision 1574 to re-look for answer tone.

Assume now that answer tone remains present on line 102 for the 20-millisecond interval. Decision 1575 thereupon determines that the 20-millisecond timer has timed out and advances the routine to step 1576. In step 1576, microprocessor 124 sets a call originate status (COS) flag in shared RAM 133 to advise common processor 101 that the "terminating" data set has answered the call and this station is entering the originating status or mode. The routine then advances to decision 1585.

In decision 1585, microprocessor 124 accesses shared RAM 133 to identify the signaling speed of the system. As previously noted, common processor 101 denotes the signaling speed and, in denoting such signaling speed, inherently identifies whether the system will act as an FSK (low speed) set or DPSK (high speed) set. Assume now that microprocessor 124 determines that the signaling speed is at 1200 bps (high speed). The processor thereupon advances to step 1586. In step 1586, microprocessor 124 selects the DPSK originate program by selecting the appropriate set of instructions in external program memory 136 and by providing signals to input terminal D1 of Digital Signal Processor 127 to initiate the signaling algorithm identified by such set of instructions. The routine then advances to step 1587 which initializes the Interrupt Handler routine to select the DPSK UART, which selection as previously described is determined in decision 1203 of the Interrupt Handler routine. The Originate routine then advances to step 1588 to enable the Interrupt Handler or, more specifically, sets a flag in an internal register to thereby instruct the processor to accept any subsequent interrupt received from gate array 135 via line 140.

After the Interrupt Handler is enabled, the routine advances to step 1589 where a timer is set. In step 1590, a "pattern" counter is cleared and the routine advances to step 1591 where a "check" routine is called which examines the incoming "scrambled" data and determines whether or not the "scrambled" data is being received in a predetermined repetitive pattern. This pattern constitutes answer tone from the remote DPSK set and the "check" routine, in response to this pattern, sets a flag to identify the reception of the answer tone. The routine advances to decision 1592 to determine whether the timer has expired and loops back to step 1591 if time out has not occurred. Alternatively, if time out has occurred, decision 1592 advances the routine to step 1593. In step 1593, the "check" routine continues to examine the incoming pattern and the routine advances to decision 1594 which determines whether the patterns (answer tone) are still being received or, alternatively, whether answer tone has terminated and carrier is now being received. If answer tone is still being received, decision 1594 loops the routine back to step 1593. Alternatively, if answer tone has terminated and carrier is being received, the routine advances to step 1595 where microprocessor 124 sets a data terminal ready flag in shared RAM 133 and, in step 1596, a 200-millisecond timer is then set. In step 1597, the Router pointer is vectored to start RTDST1 for the Disconnect routine. The Originate routine then returns to the Background routines and, at this point, the station is communicating as a DPSK set with the remote station.

Assume now that common processor 101 has instructed the set to originate a call as a low-speed FSK data set. Microprocessor 124 accesses shared RAM 133 in decision 1585 to determine the data set speed and, upon finding that the data set will transmit at a low signaling speed, advances the Originate routine to step 1600. In step 1600, microprocessor 124 signals external program memory 136 to select the FSK originate set of instructions and provides a signal to input terminal D1 of Digital Signal Processor 127 to initiate the execution of this set of instructions. The Originate routine then advances to step 1601 to initialize the Interrupt Handler to provide the FSK UART function, which decision as previously described is determined by decision 1203. The Originate routine then advances to step 1602 to enable microprocessor 124 to initiate interrupts when the interrupt (or sync) pulse is received from gate array 135. In step 1603, microprocessor 124 sets the carrier present and data set ready flags in shared RAM 133. The routine then advances to step 1604 which initializes the router vector to point to state RTDST0 in the Disconnect routine. At this point, the Originate routine returns to the Background routines or, more specifically, back to the Executive routine and the station is communicating as an FSK set.

Although a specific embodiment of this invention has been shown and described, it will be understood that various modifications may be made without departing from the spirit of this invention.

What is claimed is:

1. A data modem comprising:
   signal processing means responsive to selected ones of a plurality of sets of instructions and to signals applied to said signal processing means for executing corresponding ones of a plurality of signal converting algorithms appropriate for alternative ones of data modem types to process said applied signals, digital processing means responsive to an external signal source designating individual ones of the data modem types for executing various ones of a plurality of communication line control algorithms, and
   means responsive to the execution of the communication line control algorithms for selecting the instruction sets corresponding to the signal converting algorithms appropriate for the designated data modem types.

2. A data modem for converting baseband signals to signals in a frequency spectrum suitable for conveyance by an analog communication line, for converting line frequency signals conveyed by the communication line to baseband signals and for exchanging line control information with the communication line, comprising:
   signal processing means responsive to said baseband and line frequency signals and to selected ones of a plurality of sets of instructions for executing corresponding ones of a plurality of signal converting algorithms appropriate for alternative modes of operation of various types of data modems to process said baseband and line frequency signals,
   digital processing means responsive to an external signal source for executing a particular one of a plurality of line control algorithms appropriate for a designated one of the modems, and
   means responsive to the execution of the line control algorithm for selecting instruction sets corresponding to signal converting algorithms appropriate for the designated mode of a specific one of the data modem types.

3. A data modem in accordance with claim 2 wherein the digital processor means includes means responsive to a request by a digital device that a specific data modem type initiate a call to a remote data station for executing a sequence of operations that calls the remote data station by way of the communication line and that enables the digital device to exchange baseband data signals when the remote data station returns an answering signal, and the selecting means includes means responsive to the execution of the call operation for selecting an instruction set corresponding to a signal converting algorithm that converts the data station answering signal to baseband control signals and means responsive to the execution of the enable operation for selecting an instruction set corresponding to signal converting algorithms for converting baseband data signals to line frequency signals and for converting line frequency signals to baseband data signals in a manner appropriate for the designated mode of the specific data modem type.

4. A data modem in accordance with claim 3 wherein the execution of the call operation includes an operation that applies an off-hook condition to the communication line and the selecting means includes means responsive to the execution of the apply operation for selecting an instruction set corresponding to a signal converting algorithm that converts dial tone to baseband control signals.

5. A data modem in accordance with claim 4 wherein the execution of the call operation includes an operation that enables the digital device to send digital dialing signals when the signal processing provides the baseband control signals and the selecting means includes means responsive to the execution of the enable sending dialing signals operation for selecting an instruction set corresponding to a signal converting algorithm that converts digital dialing signals to multifrequency dialing signals.

6. A data modem in accordance with claim 2 wherein the selecting means further includes means for selecting initial ones of the instruction sets corresponding to line frequency signal to baseband signal converting algorithms appropriate for a first specific one of the data modem types and means responsive to the baseband signal thus converted from line signals by the signal processing means for selecting further instruction sets.

7. A data modem for converting baseband signals to signals in a frequency spectrum suitable for conveyance by an analog communication line and for converting line frequency signals conveyed by the communication line to baseband signals, comprising:
   signal processing means responsive to said baseband and line frequency signals and to selected ones of a plurality of sets of instructions for executing corresponding ones of a plurality of signal converting algorithms appropriate for alternative modes of operation of various types of data modems to process said baseband and line frequency signals, and
   digital processing means responsive to incoming calling signals on the communication line for executing a line control algorithm appropriate for a designated one of the modes and for selecting instruction sets corresponding to signal converting algorithms appropriate for the designated mode of a specific one of the data modem types,
   the digital processing means further including means responsive to baseband signals converted from line frequency signals by the signal processing means for selecting further instruction sets appropriate for the designated mode of a different one of the data modem types.

8. A method for converting baseband signals to signals in a frequency spectrum suitable for conveyance by an analog communication line, for converting line frequency signals conveyed by the communication line to baseband signals and for exchanging line control information with the communication line, comprising the steps of:

specifying individual ones of a plurality of data modem types, executing particular ones of a plurality of communication line control algorithms appropriate for a designated one of alternative modes of operation of data modems in response to an external signal source, selecting sets of instructions defining signal converting algorithms appropriate for the designated mode of the specified individual data modem type, and executing the signal converting algorithms in accordance with the instructions in the selected sets to perform said converting.

9. A method of converting signals and exchanging line control information, in accordance with claim 8, wherein the step of selecting sets of instructions includes the step of selecting further instruction sets defining signal converting algorithms appropriate for another individual data modem type in response to baseband signals converted from line frequency signals by the execution of the signal converting algorithm.

* * * * *